(12) United States Patent
Alvarez-Icaza Rivera et al.

(10) Patent No.: US 10,755,165 B2
(45) Date of Patent: Aug. 25, 2020

(54) CONVERTING SPIKE EVENT DATA TO DIGITAL NUMERIC DATA

(71) Applicant: International Business Machines Corporation, Armonk, NY (US)

(72) Inventors: Rodrigo Alvarez-Icaza Rivera, Mountain View, CA (US); John V. Arthur, Mountain View, CA (US); Andrew S. Cassidy, San Jose, CA (US); Steven K. Esser, San Jose, CA (US); Myron D. Flickner, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US); Benjamin G. Shaw, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 15/812,616

(22) Filed: Nov. 14, 2017

(65) Prior Publication Data
US 2018/0082174 A1    Mar. 22, 2018

Related U.S. Application Data

(63) Continuation of application No. 14/491,711, filed on Sep. 19, 2014, now Pat. No. 9,886,662.

(51) Int. Cl.
*G06N 3/06* (2006.01)

(52) U.S. Cl.
CPC .................................. *G06N 3/06* (2013.01)

(58) Field of Classification Search
None
See application file for complete search history.

(56) References Cited

U.S. PATENT DOCUMENTS

| | | |
|---|---|---|
| 5,037,376 A | 8/1991 | Richmond et al. |
| 6,823,322 B2 | 11/2004 | Olszewski |
| 7,430,546 B1 | 9/2008 | Suri |
| 8,515,885 B2 | 8/2013 | Modha |
| 8,909,576 B2 | 12/2014 | Akopyan |
| 9,515,789 B2 | 12/2016 | Zhang et al. |
| 2012/0317062 A1 | 12/2012 | Brezzo et al. |
| 2013/0073494 A1 | 3/2013 | Modha |
| 2013/0073497 A1* | 3/2013 | Akopyan ............... G06N 3/063 706/27 |
| 2013/0151450 A1 | 6/2013 | Ponulak |
| 2013/0204814 A1 | 8/2013 | Hunzinger et al. |

OTHER PUBLICATIONS

List of IBM Patents or Patent Applications Treated as Related.
(Continued)

*Primary Examiner* — Alan Chen
(74) *Attorney, Agent, or Firm* — Sherman IP LLP; Kenneth L. Sherman; Hemavathy Perumal

(57) ABSTRACT

One embodiment of the invention provides a system comprising at least one spike-to-data converter unit for converting spike event data generated by neurons to output numeric data. Each spike-to-data converter unit is configured to support one or more spike codes.

15 Claims, 24 Drawing Sheets

(56) References Cited

OTHER PUBLICATIONS

Pfeil, T. et al, "Six networks on a universal neuromorphic computing substrate", Frontiers in Neuroscience, Neuromorphic Engineering, Feb. 18, 2013, pp. 1-17, vol. 17, Article 11, Frontiers, Switzerland.
Schrauwen, B. et al., "BSA, a Fast arid Accurate Spike Train Encoding Scheme", Proceedings of the 2003 International Joint Conference on Neural Networks, Jul. 20-24, 2003, pp. 2825-2830, vol. 4, IEEE, United States.
Guerrero-Rivera, R. et al., "Programmable Logic Construction Kits for Hyper-Real-Time Neuronal Modeling", Neural Computation 18, 2006, pp. 2651-2679, No. 11, Massachusetts Institute of Technology, United States.
Esser, S.K. et al., "Cognitive Computing Systems: Algorithms and Applications for Networks of Neurosynaptic Cores", Proceedings of the 2013 International Joint Conference on Neural Networks (IJCNN), Aug. 4-9, 2013, pp. 1-10, IEEE, United States.
Cassidy, A.S. et al, "Cognitive Computing Building Block: A Versatile and Efficient Digital Neuron Model for Neurosynaptic Cores", Proceedings of the 2013 Joint Conference on Neural Networks (IJCNN), Aug. 4-9, 2013, pp. 1-10; IEEE, United States.
Bruderle, D. "Neuroscientific Modeling with a Mixed-Signal VLSI Hardware System", Dissertation, Jul. 8, 2009, pp. 1-229, University of Heidelberg, Germany.
Hamanaka, H. et al., "Quantized Spiking Neuron with A/D Conversion Functions", Proceedings of the 2006 IEEE Transactions on Circuits and Systems II: Express Briefs, Oct. 2006, pp. 1049-1053, Vo. 53, No. 10, IEEE, United States.
Hasler, J. et al., "Finding a roadmap to achieve large neuromorphic hardware systems", Frontiers in Neuroscience, Sep. 10, 2013, pp, 1-29, Vo. 7, Article 118, Frontiers, Switzerland.
Boahen, K.A., "Point-to-Point Connectivity Between Neuromorphic Chips Using Address Events," IEEE Transactions on Circuits and Systems-II: Analog and Digital Signal Processing, May 2000, pp. 416-434, vol. 47, No. 5, IEEE, United States.
Lichtsteiner, P. et al.,"A 128×128 120db 30mw asynchronous vision sensor that responds to relative intensity change." Proceedings of the 2006 IEEE International Solid-State Circuits Conference (ISSCC 2006), Digest of Technical Papers, Feb. 8, 2006, pp. 25-27, IEEE, United States.
Liu, S., et al., "Event-based 64-channel binaural silicon cochlea with Q enhancement mechanisms." Proceedings of the 2010 International Symposium on Circuits arid Systems (ISCAS), May 30, 2010-Jun. 2, 2010, pp. 2027-2030, IEEE, United States.
Linares-Barranco, A. et al.,"An AER-based actuator interface for controlling an anthropomorphic robotic hand." In Nature Inspired Problem-Solving Methods in Knowledge Engineering,Springer Berlin Heidelberg, 2007, pp. 479-489, Vo. 4528, Springer Berlin Heidelberg, Germany.
Deiss, S.R. et al., "A pulse-coded communications infrastructure for neuromorphic systems", Book, Pulsed Neural Networks, 1999, pp. 157-178, MIT Press, United States.
Wu, J. et al., "A router for massively-parallel neural simulation", Doctoral dissertation, University of Manchester, 2010, pp. 1-165.
Imam, N. et al., "A Digital Neurosynaptic Core Using Event-Driven QDI Circuits", 2012 IEEE 18th International Symposium on Asynchronous Circuits and Systems, May 7, 2012, pp. 25-32, IEEE, United States.

\* cited by examiner

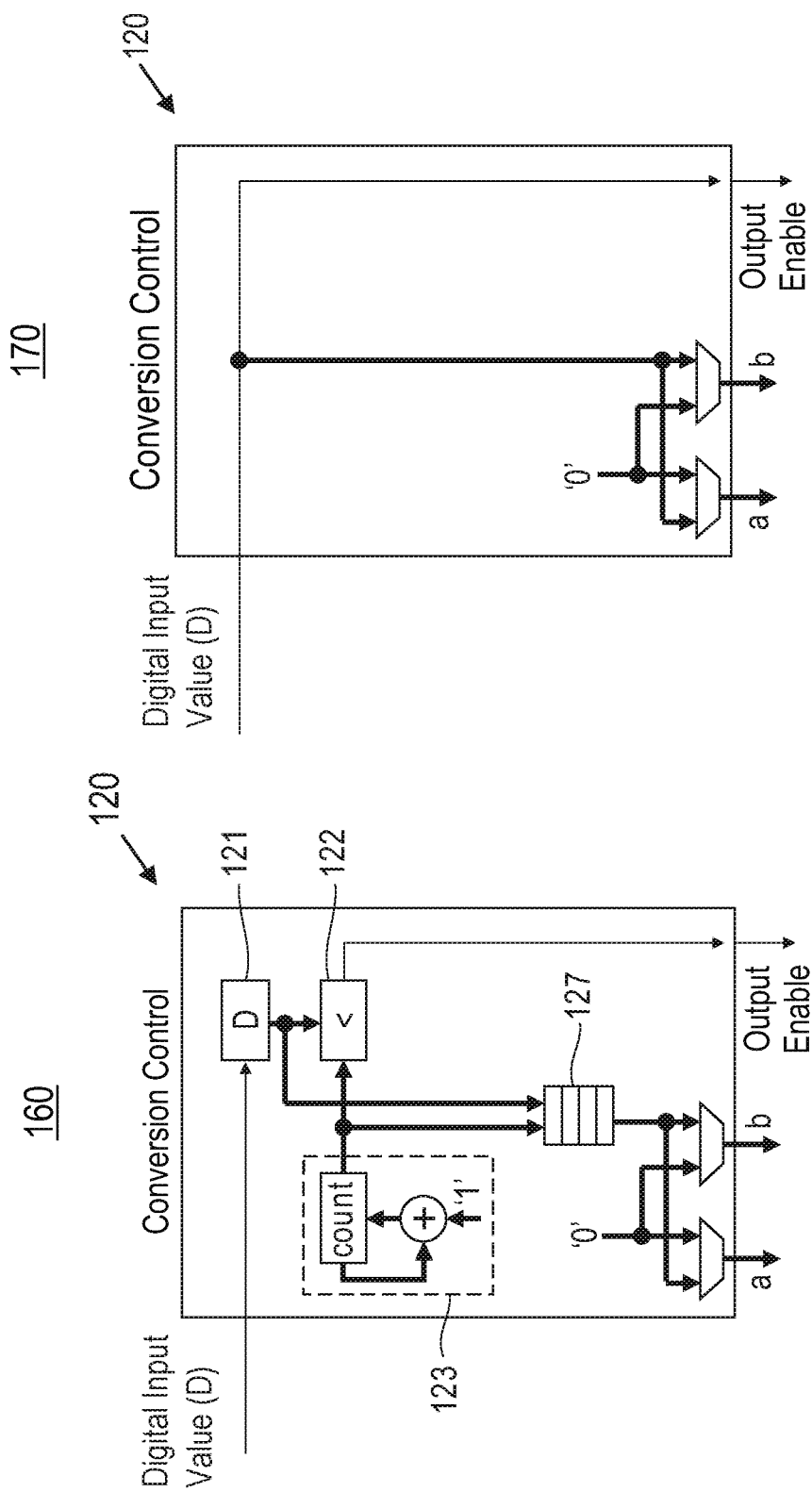

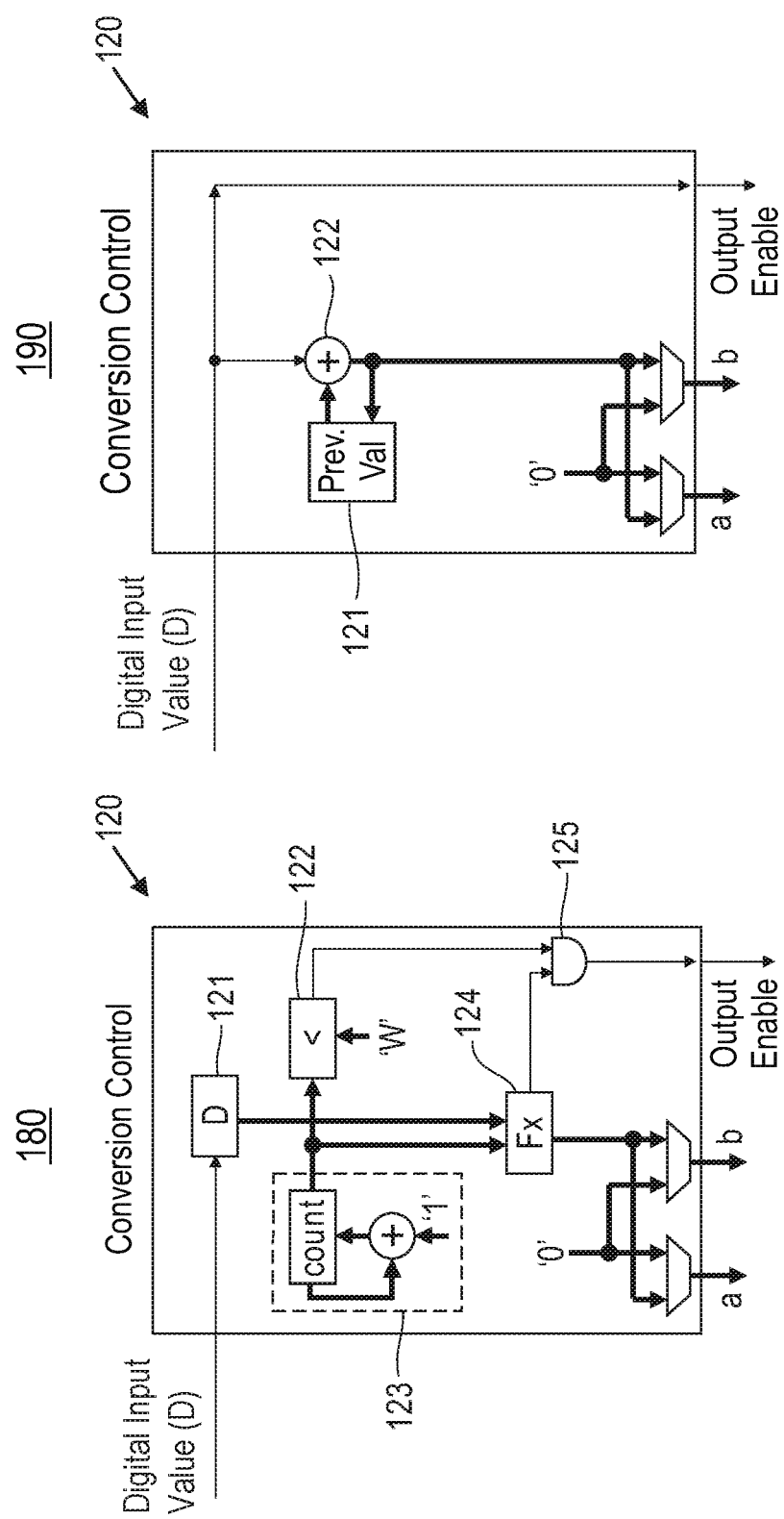

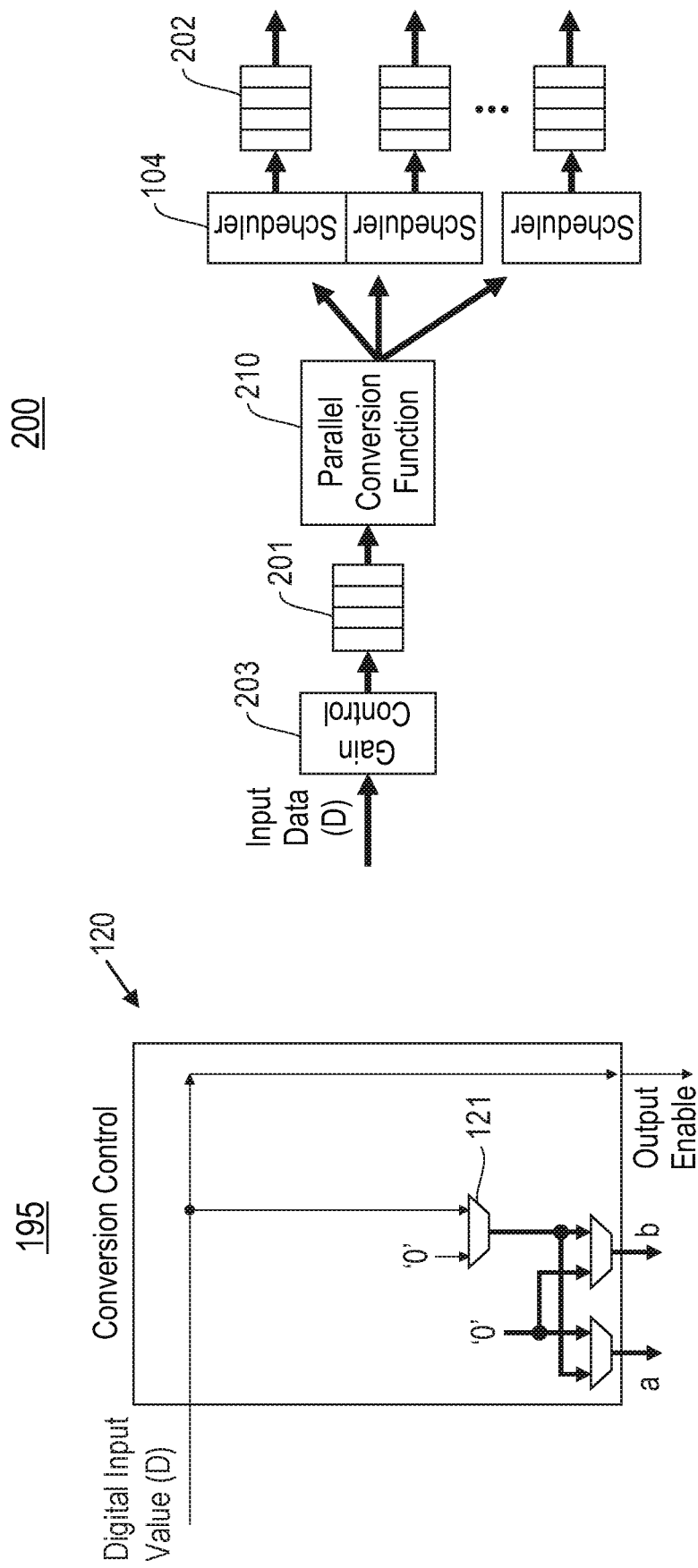

CONVERTING SPIKE EVENT DATA TO DIGITAL NUMERIC DATA

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, converting spike event data to digital numeric data.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

One embodiment of the invention provides a system comprising at least one spike-to-data converter unit for converting spike event data generated by neurons to output numeric data. Each spike-to-data converter unit is configured to support one or more spike codes.

Another embodiment of the invention provides a system comprising a plurality of neurosynaptic core circuits and at least one spike-to-data converter unit for converting spike event data generated by neurons to output numeric data. Each spike-to-data converter unit is configured to support one or more spike codes. Each neurosynaptic core circuit comprises one or more electronic neurons, one or more electronic axons, and a plurality of synapse devices for interconnecting said one or more electronic neurons with said one or more electronic axons.

Another embodiment of the invention provides a method comprising receiving spike event data generated by neurons, and converting the spike event data to output numeric data using at least one at least one spike-to-data converter unit. Each spike-to-data converter unit is configured to support one or more spike codes.

These and other features, aspects and advantages of the present invention will become understood with reference to the following description, appended claims and accompanying figures.

BRIEF DESCRIPTION OF THE SEVERAL VIEWS OF THE DRAWINGS

FIG. 8 is an example configuration for the serial conversion control function unit, wherein the serial conversion control function unit is configured to support generation of spike event data based on the uniform rate code and/or the uniform population code, in accordance with an embodiment of the invention;

FIG. 9 is an example configuration for the serial conversion control function unit, wherein the serial conversion control function unit is configured to support generation of spike event data based on the time-to-spike time code and/or the labeled line code, in accordance with an embodiment of the invention;

FIG. 10 is an example configuration for the serial conversion control function unit, wherein the serial conversion control function unit is configured to support generation of spike event data based on the time slot code and/or the position code, in accordance with an embodiment of the invention;

FIG. 11 is an example configuration for the serial conversion control function unit, wherein the serial conversion control function unit is configured to support generation of spike event data based on the time interval code and/or the axon interval code, in accordance with an embodiment of the invention;

FIG. 12 is another example configuration for the serial conversion control function unit, wherein the serial conversion control function unit is configured to support generation of spike event data based on the time interval time code and/or the axon interval code, in accordance with an embodiment of the invention;

FIG. 13 is an example parallel configuration of a data-to-spike converter system, in accordance with an embodiment of the invention;

DETAILED DESCRIPTION

Embodiments of the invention relate to neuromorphic and synaptronic computation, and in particular, converting spike event data to digital numeric data. One embodiment of the invention provides a system comprising a spike-to-data converter unit for converting spike event data generated by neurons to output numeric data. The spike-to-data converter unit is configured to support one or more spike codes.

The term electronic neuron as used herein represents an framework configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising digital circuits, the present invention is not limited to electronic circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

Figure 1A:
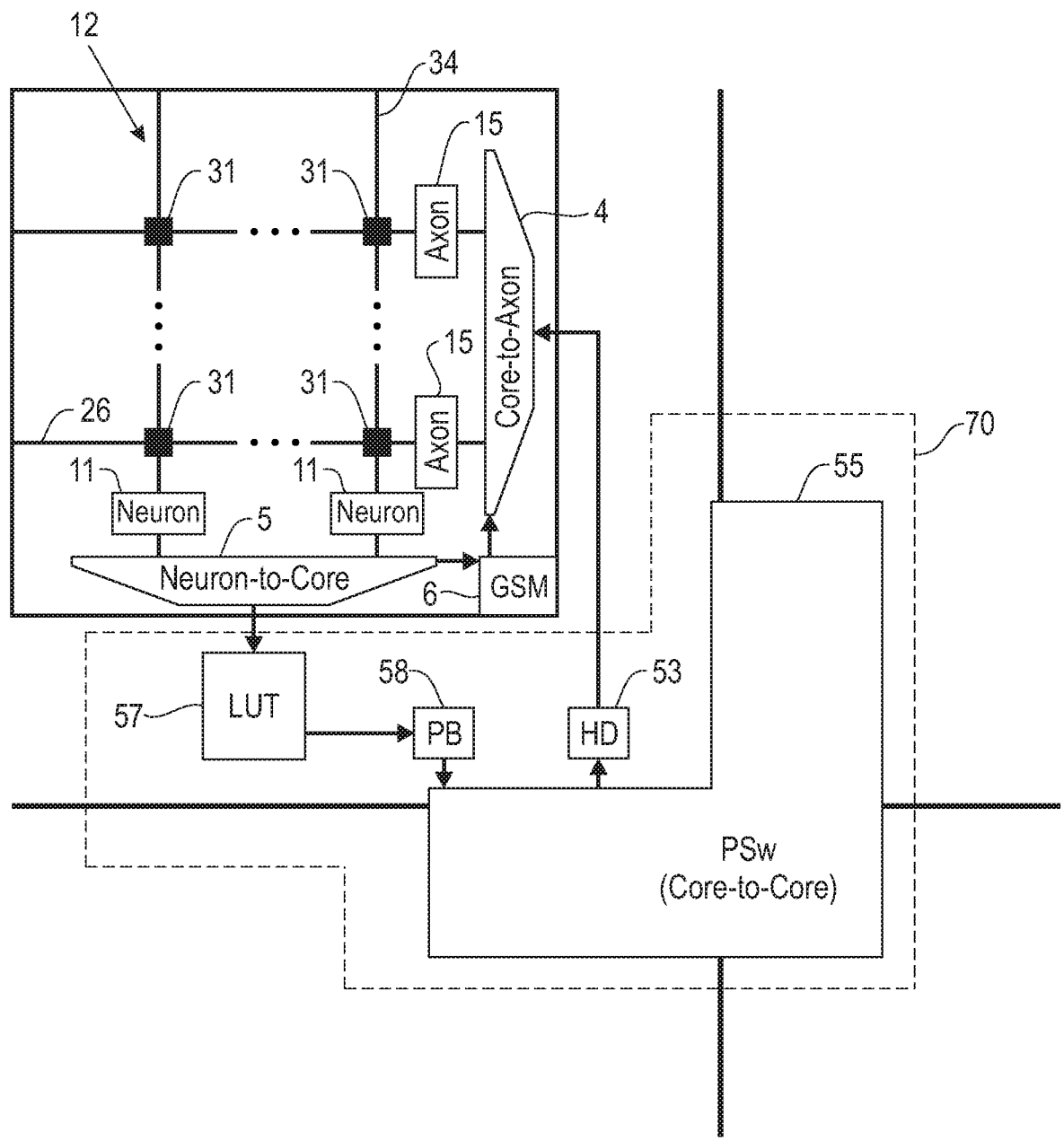
FIG. 1A illustrates an example neurosynaptic core circuit ("core circuit"), in accordance with an embodiment of the invention.

FIG. 1A illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "x" represents multiplication, and m and n are positive integers.

Each synapse 31 communicates spike events (i.e., firing events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends spike events to the connected axon path 26. Each neuron 11 is connected to a dendrite path 34, and receives spike events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the spike events received, each neuron 11 generates a spike event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive spike events and generate a spike event according to the neuronal activation function. In one embodiment, the neurons 11 and axons 15 include comparator circuits that generate spike events according to the neuronal activation function. In one embodiment, the synapses 31 are implemented using 1-bit static random-access memory (SRAM) cells. Neurons 11 that generate a spike event are selected one at a time, and the spike events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine (GSM). The address-event receiver 4 receives spike events and transmits them to target axons 15. The address-event transmitter 5 transmits spike events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises one or more packet routing systems 70. Each packet routing system 70 is configured to selectively route spike events among multiple core circuits 10. In one embodiment, each packet routing system 70 comprises an address lookup table (LUT) module 57, a packet builder (PB) module 58, a head delete (HD) module 53, and a core-to-core packet switch (PSw) 55. The LUT 57 is an N address routing table is configured to determine target axons 15 for spike events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts spike events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped spike event to the address-event receiver 4.

In one example implementation, the core circuit 10 may comprise 256 neurons 11. The crossbar 12 may be a 256× 256 ultra-dense crossbar array that has a pitch in the range of about 0.1 nm to 10 µm. The LUT 57 of the core circuit 10 may comprise 256 address entries, each entry of length 32 bits.

In one embodiment, soft-wiring in the core circuit 10 is implemented using address events (e.g., Address-Event Representation (AER)).

Although certain illustrative embodiments of the invention are described herein using synapses comprising electronic circuits, the present invention is not limited to electronic circuits.

Real world data is often represented using digital numeric data. Neural computer architectures, however, require spike event data for data representation and computation. Embodiments of the invention provide systems for converting between digital numeric data and spike event data.

Figure 1B:
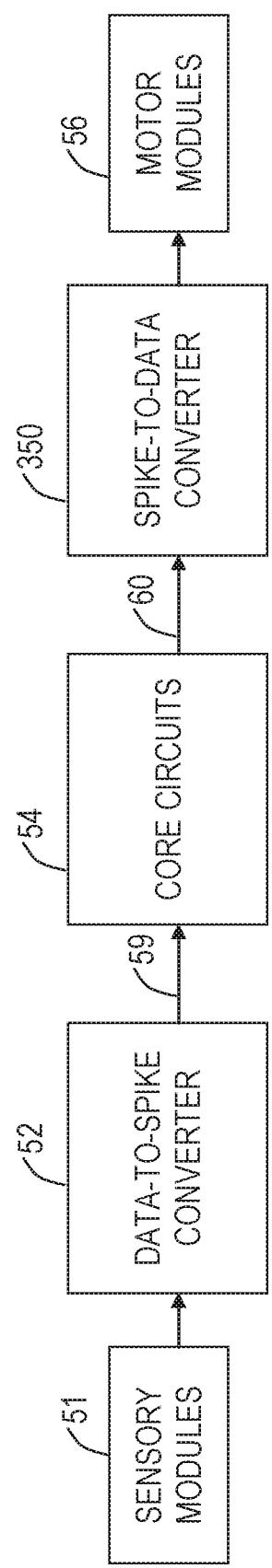
FIG. 1B illustrates an example neurosynaptic system, in accordance with an embodiment of the invention.

FIG. 1B illustrates an example neurosynaptic system 50, in accordance with an embodiment of the invention. The neurosynaptic system 50 comprises a data-to-spike converter system 52, a population 54 of core circuits 10, and a spike-to-data converter system 350.

In this specification, let D denote external input data received by the neurosynaptic system 50. The input data D includes digital numeric data. In one embodiment, the input data D represents sensory inputs. For example, the neurosynaptic system 50 may receive sensory inputs from an external environment including one or more sensory modules 51.

The data-to-spike converter system 52 converts the input data D to spike event data. As described in detail later herein, the data-to-spike converter system 52 may be configured to convert the input data D to spike event data in either a parallel manner or a serial manner. An output bus 59 transmits spike event data from the data-to-spike converter system 52 to the core circuits 10 for computation and/or processing.

In this specification, let Y denote external output data from the neurosynaptic system 50. The output data Y includes digital numeric data. Output spike event data generated by the core circuits 10 is transmitted to the spike-to-data converter system 350 via an output bus 60. The spike-to-data converter system 350 converts the output spike event data generated by the core circuits 10 to output data Y. In one embodiment, the output data Y represents motor outputs. For example, the neurosynaptic system 50 may provide motor outputs to an external environment including one or more motor/actuator modules 56.

As described in detail later herein, the data-to-spike converter system 52 and the spike-to-data converter system 350 are configurable to support different spike coding schemes ("spike codes"). Further, the converter systems 52, 350 may be implemented using synchronous or asynchronous logic.

In one embodiment, the input data D is pre-processed before the input data D is converted to spike event data. For example, the input data D may be pre-processed in accordance with one or more of the following pre-processing functions: automatic gain control pre-processing, delta code conversion pre-processing, toggle code conversion pre-processing, signed data pre-processing, and variance code conversion pre-processing.

In one embodiment, the output data Y is post-processed in accordance with one or more of the following post-processing functions: automatic gain control post-processing, delta code conversion post-processing, toggle code conversion post-processing, signed data post-processing, and variance code conversion post-processing.

Figure 2:
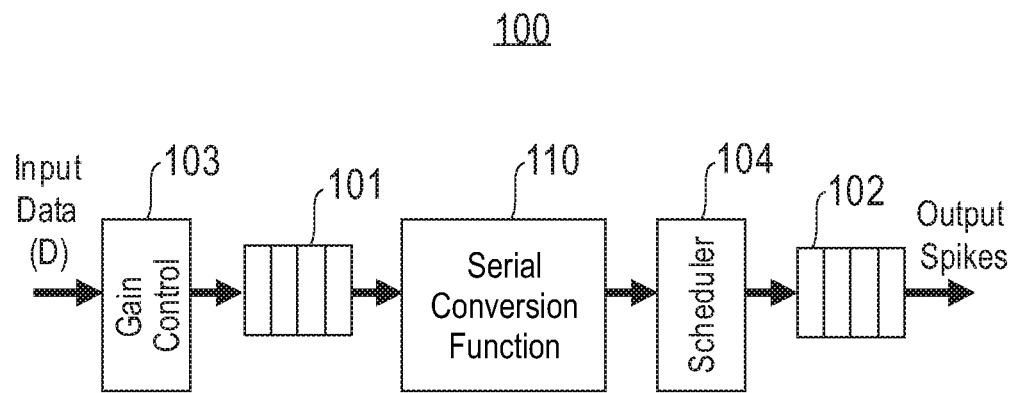
FIG. 2 is an example serial configuration of a data-to-spike converter system, in accordance with an embodiment of the invention.

In one embodiment, the data-to-spike converter system 52 supports a serial conversion method. For example, FIG. 2 is an example serial configuration of a data-to-spike converter system 100, in accordance with an embodiment of the invention. The data-to-spike converter system 100 comprises a serial conversion function unit 110 for generating spike event data. As described in detail later herein, the serial conversion function unit 110 generates spike event data by converting digital numeric data to spike event data.

In one embodiment, the data-to-spike converter system 100 comprises only the serial conversion function unit 110. The serial conversion function unit 110 converts the input data D received by neurosynaptic system 50 to spike event data, and outputs the spike event data to the output bus 59 that transmits the spike event data to the core circuits 10 of the neurosynaptic system 50 for processing.

In another embodiment, the data-to-spike converter system 100 further comprises one or more optional components, such as a gain control unit 103, an input buffer unit 101, a scheduler unit ("scheduler") 104 or an output buffer unit 102. In one embodiment, each buffer unit 101, 102 is a first-in first-out (FIFO) buffer unit.

If the data-to-spike converter system 100 includes the gain control unit 103, the input data D received by the neurosynaptic system 50 is first scaled by the gain control unit 103. In one embodiment, the gain control unit 103 applies a transformation operation on the input data D in accordance with equation (1) provided below:

$$D_{scale} = \text{scale} * (D + \text{offset}) \quad (1),$$

wherein offset and scale are configurable parameters. The serial conversion function unit 110 then converts the scaled input data $D_{scale}$ to spike event data.

If the data-to-spike converter system 100 includes the input buffer unit 101, the input buffer unit 101 buffers the input data D/the scaled input data $D_{scale}$. The serial conversion function unit 110 then reads data out of the input buffer unit 101 and converts the data read to spike event data. The input buffer unit 101 is necessary if the rate at which input data D arrives is faster than the rate at which the serial conversion function unit 110 generates spike event data.

Spike event data includes one or more output spike event packets, wherein each output spike is encapsulated in a spike event packet. A spike event packet targeting an axon 15 of the neurosynaptic system 50 may include a delivery timestamp representing when the spike event packet should be delivered to the target axon 15. A spike event packet, however, may not include a delivery timestamp. If the data-to-spike converter system 100 includes the scheduler 104, the scheduler 104 buffers each spike event packet that does not include a delivery timestamp, and outputs the spike event packet to the output bus 59 at the appropriate time.

If the data-to-spike converter system 100 includes the output buffer unit 102, the output buffer unit 102 buffers spike event data before the spike event data is output to the output bus 59. The output buffer unit 102 is necessary if the rate at which the serial conversion function unit 110 generates spike event data is faster than the rate at which the output bus 59 transmits spike event data to the core circuits 10 of the neurosynaptic system 50 for processing.

Figure 3:
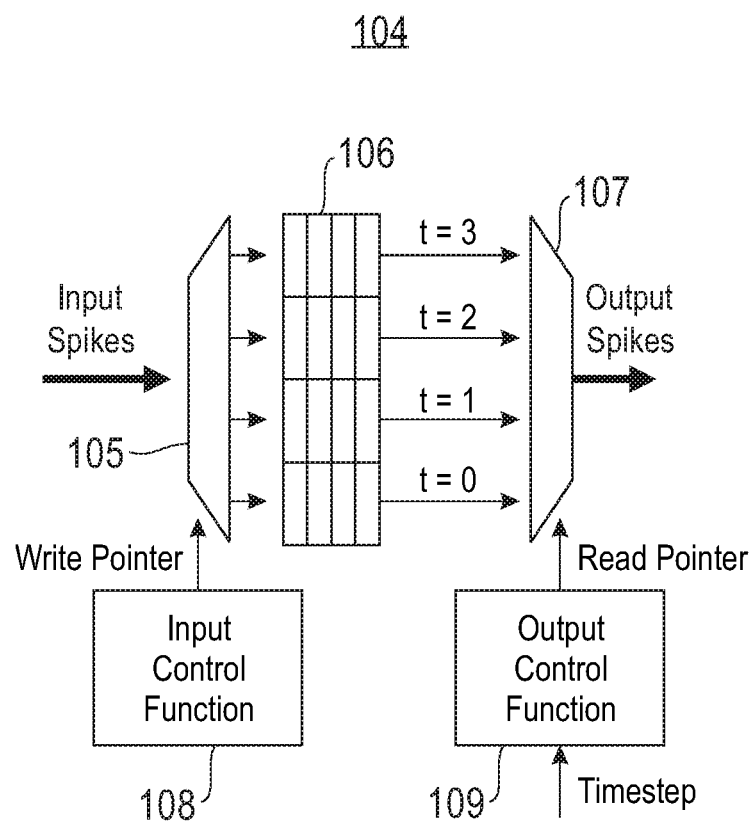
FIG. 3 illustrates an example scheduler, in accordance with an embodiment of the invention.

FIG. 3 illustrates an example scheduler 104, in accordance with an embodiment of the invention. The scheduler 104 is logically organized as a bank 106 of buffer units. In one embodiment, the scheduler 104 is physically implemented as separate FIFO buffer units. In another embodiment, the scheduler 104 is physically implemented as a single dual-port memory.

The scheduler 104 further comprises an input control unit 105 for receiving spike event data generated by the serial conversion function unit 110. In one embodiment, the input control unit 105 is a de-multiplexor. Each buffer unit of the bank 106 corresponds to a particular timestep. The input control unit 105 queues each spike event packet in an appropriate buffer unit of the bank 106 based on a delivery time of the spike event packet.

In this specification, let t denote a timestep. As shown in FIG. 3, in one example implementation, the bank 106 includes a first buffer unit for spike event packets scheduled for delivery when timestep t is 0, a second buffer unit for spike event packets scheduled for delivery when timestep t is 1, a third buffer unit for spike event packets scheduled for delivery when timestep t is 2, and a fourth buffer unit for spike event packets scheduled for delivery when timestep t is 3.

The scheduler 104 further comprises an output control unit 107 for reading out spike event packets from the bank 106. In one embodiment, the output control unit 107 is a multiplexor. Specifically, at each timestep, the output control unit 107 reads out all spike event packets queued within a buffer unit corresponding to the timestep, and outputs the spike event packets read to the output buffer unit 102/the output bus 59.

If the scheduler 104 is physically implemented as a dual-port memory, the input control unit 105 and the output control unit 107 may be controlled by an input control function unit 108 and an output control function unit 109, respectively. The input control function unit 108 maintains a write pointer that references a memory location/buffer unit of the bank 106 to write a spike event packet to in a subsequent write operation. The output control function unit 109 maintains a read pointer that references a memory location/buffer unit of the bank 106 to read out a spike event packet from in a subsequent read operation.

Each spike event packet generated may have explicit time or implicit time. The data-to-spike converter system 100 may be configured to support different explicit time and/or implicit spike codes. For example, the data-to-spike converter system 100 is configurable to support a first example explicit spike code where each spike event packet is encoded with explicit time and each spike event packet is tracked at a corresponding destination/target axon that the spike event packet is delivered to. A spike event definition for each spike event packet includes a corresponding target address addr and a corresponding delivery timestamp ts, wherein the delivery timestamp ts specifies when the spike event packet should be processed at the target address addr. The scheduler 104 is not required if data-to-spike converter system 100 is configured to support the first example explicit spike code.

As another example, the data-to-spike converter system 100 is configurable to support a second example explicit spike code where each spike event packet is tracked at a source that generated the spike event packet (i.e., the serial conversion function unit 110). A spike event definition for each spike event packet includes a corresponding target address addr but no corresponding delivery timestamp ts. The scheduler 104 is required if the data-to-spike converter system 100 is configured to support the second explicit spike code. The serial conversion function unit 110 uses the scheduler 104 to output each spike event packet to the output bus 59 at the appropriate time.

As yet another example, the data-to-spike converter system 100 is configurable to support a third example implicit spike code where spike event packets are processed on a first-come, first-serve basis, and each spike event packet arrives at a corresponding destination when it arrives (i.e., the arrival time of the spike event packet is the real time that the spike event packet physically arrives at the destination). A spike event definition for each spike event packet includes a corresponding target address addr but no corresponding delivery timestamp ts. The data-to-spike converter system 100 outputs each spike event packet to the output bus 59 at an appropriate time using the scheduler 104. The scheduler 104 is not required if the data-to-spike converter system 100 is configured to support the third example implicit spike code. Further, there is no need to compute a corresponding delivery timestamp ts for each spike event packet.

Figure 4:
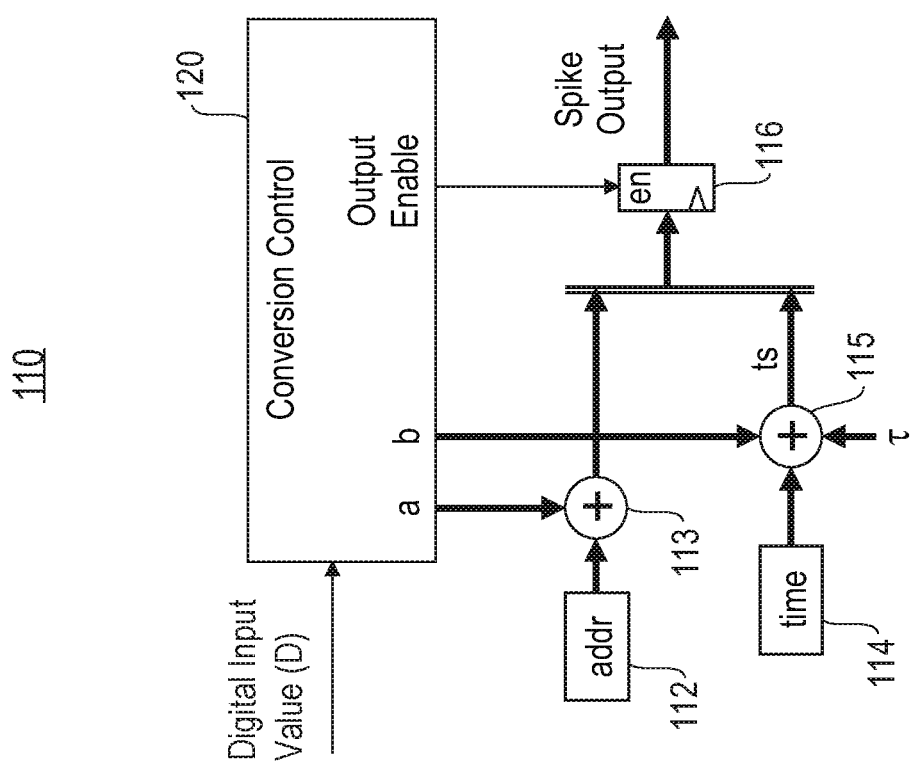
FIG. 4 illustrates a block diagram of the serial conversion function unit, in accordance with an embodiment of the invention.

FIG. 4 illustrates a block diagram of the serial conversion function unit 110, in accordance with an embodiment of the invention. The serial conversion function unit 110 comprises a serial conversion control function unit 120 for controlling the generation of spike event data. The serial conversion function unit 110 further comprises a first adder unit 113, a second adder unit 115 and an output register 116.

In this specification, let A denote an address offset. Let time denote a current time value. Let $\tau$ denote a time offset.

For each input D, the serial conversion function unit 110 generates a corresponding spike event packet in the following manner: the serial conversion control function unit 120 generates a first value a for use in determining a corresponding target address addr for the spike event packet. Specifically, the first adder unit 113 adds the first value a to a predetermined address value, and the resulting sum from the first adder unit 113 represents the target address addr for the spike event packet. In one embodiment, the predetermined address value is provided to the data-to-spike converter system 100 together with the input data D. In another embodiment, an address register/memory unit 112 provides the first adder unit 113 with the predetermined address value.

The serial conversion control function unit 120 further generates a second value b for use in determining a corresponding delivery timestamp ts for the spike event packet. Specifically, the second adder unit 115 adds the second value b and a time offset $\tau$ to a current time, and the resulting sum from the second adder unit 115 represents the delivery timestamp ts for the spike event packet. In one embodiment, a time module 114 provides the data-to-spike converter system 100 with the current time value.

If the data-to-spike converter system 100 is configured to support the first example explicit spike code, both the target address addr and the delivery timestamp ts are combined and encapsulated into a spike event packet that is written to the output register 116. If the data-to-spike converter system 100 is configured to support the second example explicit spike code or the first example implicit spike code, only the target address addr is encapsulated into a spike event packet that is written to the output register 116.

The serial conversion control function unit 120 is further configured to generate an enable signal. The output register 116 outputs the spike event packet when the enable signal is asserted. The required number of spike events packets to output for each input data D is based on the input data D. The enable signal facilitates the output of the required number of spike events packets for each input data D.

The data-to-spike converter system 51 is configurable to support generation of spike event data based on different spike codes. The different spike codes include single-valued ("binary") codes and multi-valued codes based on temporal domain/time or population domain/space.

For example, to generate spike event packets based on a population domain/space multi-valued code, the serial conversion control function unit 120 is configured to set the first value a to non-zero values and the second value b to zero values. To generate spike event packets based on a temporal domain/time multi-valued code, the serial conversion control function unit 120 is configured to set the first value a to zero values and the second value b to non-zero values. To generate spike event packets based on a hybrid of a population domain/space multi-valued code and a temporal domain/time multi-valued code, the serial conversion control function unit 120 is configured to set the first value a and the second value b to non-zero values.

In the binary code, a spike event packet for input data D is generated if the input data D is '1'. The binary code may be deterministic or stochastic. Table 1 below provides example pseudo-code for encoding a target address addr and a corresponding delivery timestep is for a spike event packet based on the binary code.

TABLE 1 if (D),
    addr = $\Delta$;
    ts = time + $\tau$;

There are different types of multi-valued codes based on temporal domain/time, such as stochastic time code, uniform rate code, arbitrary rate code, burst code, time-to-spike code, time slot code and time interval code. A target address addr for each spike event packet generated based on a temporal domain/time multi-valued code is always encoded in accordance with equation (2) provided below, regardless of the type of temporal domain/time multi-valued code used to generate the spike event packet:

$$addr = \Delta \quad (2).$$

In the stochastic time code, over time, a spike event packet for input data D is generated with probability proportional to the input data D. Table 2 below provides example pseudo-code for encoding a corresponding delivery timestep ts for a spike event packet based on the stochastic time code.

TABLE 2 if (D> PRNG), //PRNG is a random number drawn from a pseudo random number generator
    ts = time + $\tau$;

In the uniform rate code, the number of spike event packets generated for input data D is proportional to the input data D and uniformly distributed over a span of time. By comparison, in the arbitrary rate code, multiple spike event packets are generated for input data D and arbitrarily distributed over a span of time. Table 3 below provides example pseudo-code for encoding a corresponding delivery timestep ts for a spike event packet based on the uniform rate code or the arbitrary rate code.

TABLE 3 for (i = 1:D),
    val = LUT[16*D + i]; //LUT is a lookup table
    ts = time + val + $\tau$;

In the burst code, the number of spike event packets generated for input data D is proportional to the input data D, and the spike event packets are outputted continuously at either the beginning or the end of a timestep. Table 4 below provides example pseudo-code for encoding a corresponding delivery timestep ts for a spike event packet based on the burst code.

TABLE 4 for (i = 1:D),
    ts = time + i + $\tau$;

In the time-to-spike code, a single event packet is generated for input data D with a delivery delay proportional to the input data D. Table 5 below provides example pseudo-code for encoding a corresponding delivery timestep ts for a spike event packet based on the time-to-spike code.

TABLE 5 ts = time + D + $\tau$;

In the time slot code, spike event packets for input data D are outputted at time steps corresponding to particular values (e.g., 1, 2, 4, 8) that are summed. Table 6 below provides example pseudo-code for encoding a corresponding delivery timestep ts for a spike event packet based on the time slot code.

TABLE 6 for (j = 1:W), //W is the number of bits in D
    val = f(D,j);
    ts = time + val + $\tau$;

In the time interval code, spike event packets for input data D are generated such that the temporal interval between spike event packets is proportional to the input data D. Table 7 below provides a first example pseudo-code for encoding a corresponding delivery timestep ts for a spike event packet based on the time interval code.

TABLE 7 ts = prev_time + D + $\tau$; //prev_time is a previous time value
prev_time = prev_time + D Table 8 below provides a second example pseudo-code for encoding a corresponding delivery timestep ts for a spike event packet based on the time interval code.

TABLE 8 ts = time + $\tau$;
ts = time + D + $\tau$;

There are different types of multi-valued codes based on population domain/space, such as stochastic axon code, uniform population code, arbitrary population code, thermometer code, labeled line code, position code and axon interval code. A delivery timestamp ts for each spike event packet generated based on a population domain/space multi-valued code is always encoded in accordance with equation (3) provided below, regardless of the type of population domain/space multi-valued code used to generate the spike event packet:

$$ts = time + \tau \quad (3).$$

In the stochastic axon code, across a range of axon addresses, a spike event packet for input data D is generated with probability proportional to the input data D. Table 9 below provides example pseudo-code for encoding a corresponding target address addr for a spike event packet based on the stochastic axon code.

TABLE 9 if (D> PRNG), //PRNG is a random number drawn from a pseudo random number generator
    addr = $\Delta$;

In the uniform population code, the number of spike event packets generated for input data D is proportional to the input data D and uniformly distributed across a range of axon addresses. By comparison, in the arbitrary population code, multiple spike event packets are generated for input data D and arbitrarily distributed across a range of axon addresses. Table 10 below provides example pseudo-code for encoding a corresponding target address addr for a spike event packet based on the uniform population code or the arbitrary population code.

TABLE 10

```
for (i = 1:D),
    val = LUT[16*D + i]; //LUT is a lookup table
    addr = val + Δ;
```

In the thermometer code, the number of spike event packets generated for input data D is proportional to the input data D, and the spike event packets are delivered to adjacent address lines either at the start or the end of a range of axon addresses. Table 11 below provides example pseudo-code for encoding a corresponding target address addr for a spike event packet based on the thermometer code.

TABLE 11

```
for (i = 1:D),
    addr = i + Δ;
```

In the labeled line code, a single event packet for input data D is delivered to an axon address that is proportional to the input data D. Table 12 below provides example pseudo-code for encoding a corresponding target address addr for a spike event packet based on the labeled line code.

TABLE 12

```
addr = D + Δ;
```

In the position code, spike event packets for input data D are delivered to axon addresses corresponding to particular values (e.g., 1, 2, 4, 8) that are summed. Table 13 below provides example pseudo-code for encoding a corresponding target address addr for a spike event packet based on the position code.

TABLE 13

```
for (j = 1:W), //W is the number of bits in D
    val = f(D,j);
    addr = val + Δ;
```

In the axon interval code, spike event packets for input data D are delivered such that the interval between target addresses is proportional to the input data D. Table 14 below provides a first example pseudo-code for encoding a corresponding target address addr for a spike event packet based on the axon interval code.

TABLE 14

```
addr = prev_addr + D + Δ; //prev_addr is a previous target address
prev_addr = prev_addr + D
```

Table 15 below provides a second example pseudo-code for encoding a corresponding target address addr for a spike event packet based on the axon interval code.

TABLE 15

```
addr = Δ;
addr = D + Δ;
```

Figure 5:
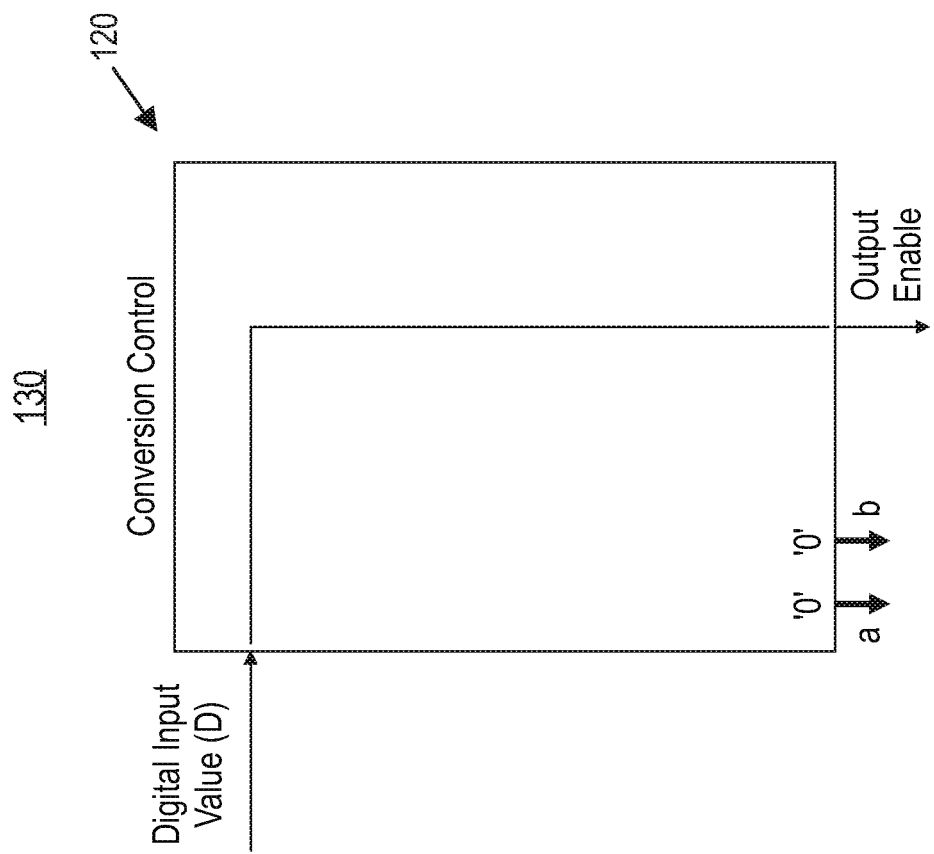
FIG. 5 is an example configuration for the serial conversion control function unit, wherein the serial conversion control function unit is configured to support generation of spike event data based on the binary code.

FIG. 5 is an example configuration 130 for the serial conversion control function unit 120, wherein the serial conversion control function unit 120 is configured to support generation of spike event data based on the binary code, in accordance with an embodiment of the invention. When configured in accordance with the example configuration 130, the first value a and the second value b are set to zero values. When input data D arrives, the serial conversion control function unit 120 asserts an enable signal to output a spike event packet for the input data D. Therefore, when configured in accordance with the example configuration 130, the serial conversion control function unit 120 generates and outputs, for each input data D, a single spike event packet for the input data D.

Figures 6, 7:
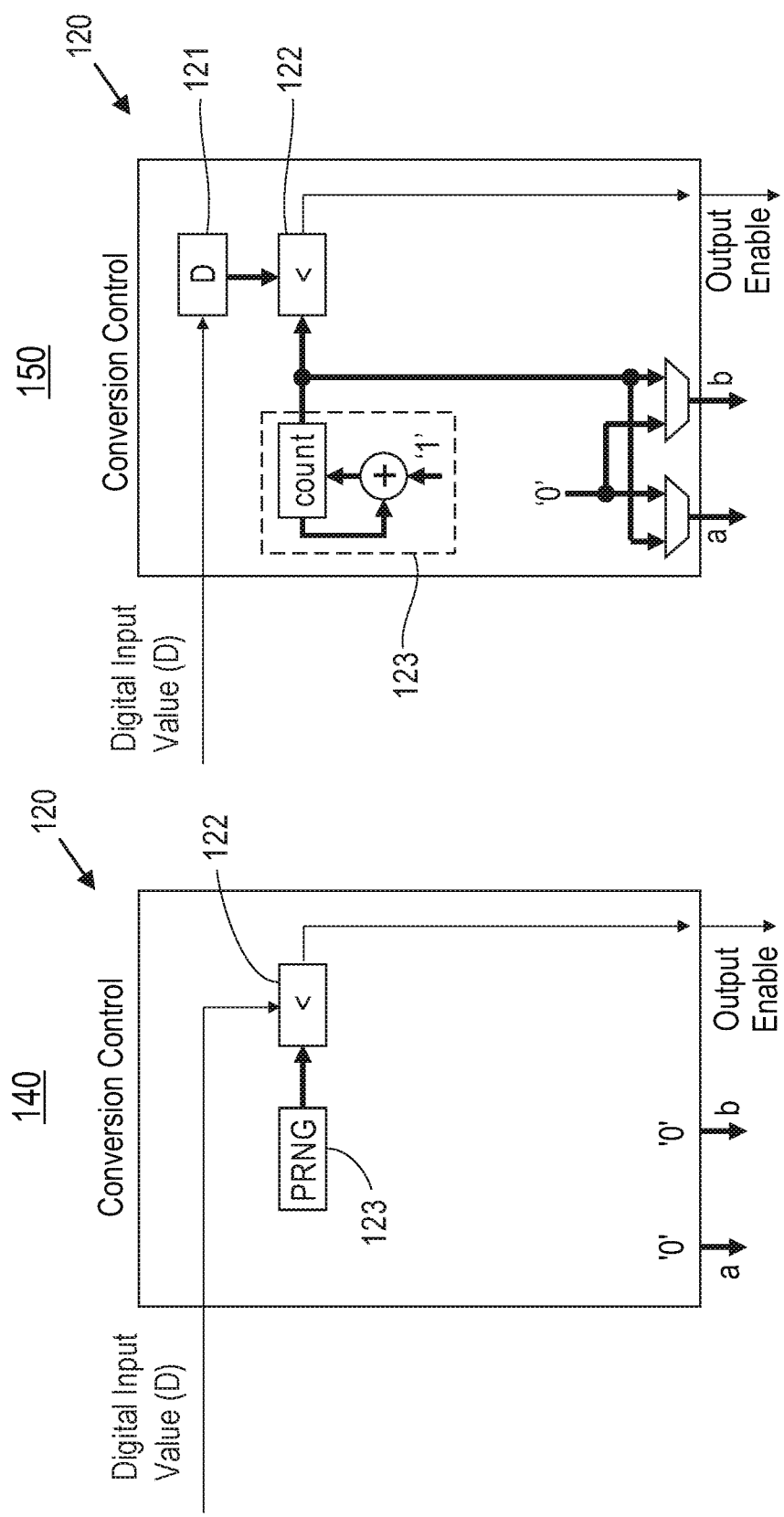
FIG. 6 is an example configuration for the serial conversion control function unit, wherein the serial conversion control function unit is configured to support generation of spike event data based on the stochastic time code and/or the stochastic axon code.
FIG. 7 is an example configuration for the serial conversion control function unit, wherein the serial conversion control function unit is configured to support generation of spike event data based on the burst code and/or the thermometer code, in accordance with an embodiment of the invention.

FIG. 6 is an example configuration 140 for the serial conversion control function unit 120, wherein the serial conversion control function unit 120 is configured to support generation of spike event data based on the stochastic time code and/or the stochastic axon code, in accordance with an embodiment of the invention. When configured in accordance with the example configuration 140, the first value a and the second value b are set to zero values.

When configured in accordance with the example configuration 130, the serial conversion control function unit 120 comprises a pseudorandom number generator (PRNG) 123 and a comparator unit 122. When input data D arrives, the PRNG 123 draws a random number, and the comparator unit 122 compares the random number against the input data D. If the input data D is greater than the random number, the serial conversion control function unit 120 asserts an enable signal to output a spike event packet for the input data D.

FIG. 7 is an example configuration 150 for the serial conversion control function unit 120, wherein the serial conversion control function unit 120 is configured to support generation of spike event data based on the burst code and/or the thermometer code, in accordance with an embodiment of the invention. When configured in accordance with the example configuration 150, the serial conversion control function unit 120 comprises an input register 121, a comparator unit 122 and a counter module 123. When input data D arrives, the input data D is stored in the input register 121. The counter module 123 is started when the input data D is read from the input register 121. The comparator unit 122 compares a counter value from the counter module 123 against the input data D. If the counter value is less than the input data D, the serial conversion control function unit 120 asserts an enable signal to output a spike event packet for the input data D. As the counter module 123 increments the counter value, the enable signal is asserted for a D number of cycles to create D spike event packets.

When configured in accordance with the example configuration 150 to support the burst code, the first value a is set to zero values and the counter value is sent to coefficients of the second value b.

When configured in accordance with the example configuration 150 to support the thermometer code, the second value b is set to zero values and the counter value is sent to coefficients of the first value a.

FIG. 8 is an example configuration 160 for the serial conversion control function unit 120, wherein the serial conversion control function unit 120 is configured to support generation of spike event data based on the uniform rate code and/or the uniform population code, in accordance with an embodiment of the invention. When configured in accordance with the example configuration 160, the serial conversion control function unit 120 comprises an input register 121, a comparator unit 122, a counter module 123 and a lookup table (LUT) 127. When input data D arrives, the input data D is stored in the input register 121. The counter module 123 is started when the input data D is read from the input register 121. The comparator unit 122 compares a counter value from the counter module 123 against the input data D. If the counter value is less than the input data D, the serial conversion control function unit 120 asserts an enable signal to output a spike event packet for the input data D. The counter value and the input data D are combined to address the LUT 127. As the counter module 123 increments the counter value, the enable signal is asserted for a D number of cycles to create D spike event packets.

When configured in accordance with the example configuration 160 to support the uniform rate code, the first value a is set to zero values and the value read from the LUT 127 is sent to coefficients of the second value b.

When configured in accordance with the example configuration 160 to support the uniform population code, the second value b is set to zero values and the value read from the LUT 127 is sent to coefficients of the first value a.

The LUT 127 enables the serial conversion control function unit 120 to transmit spike event packets at arbitrary offsets, thereby enabling the creation of arbitrary spike distributions in the temporal domain/time or population domain/space.

FIG. 9 is an example configuration 170 for the serial conversion control function unit 120, wherein the serial conversion control function unit 120 is configured to support generation of spike event data based on the time-to-spike time code and/or the labeled line code, in accordance with an embodiment of the invention. When input data D arrives, the input data D is sent directly to coefficients of the first value a or coefficients of the second value b, and the serial conversion control function unit 120 asserts an enable signal to output a spike event packet for the input data D. Therefore, when configured in accordance with the example configuration 170, the serial conversion control function unit 120 generates a single spike event packet for each input data D, wherein the spike event packet is outputted at a time offset or address offset based on the input data D.

FIG. 10 is an example configuration 180 for the serial conversion control function unit 120, wherein the serial conversion control function unit 120 is configured to support generation of spike event data based on the time slot code and/or the position code, in accordance with an embodiment of the invention. When configured in accordance with the example configuration 180, the serial conversion control function unit 120 comprises an input register 121, a comparator unit 122, a counter module 123, a value conversion function unit 124, and an AND unit 125. When input data D arrives, the input data D is stored in the input register 121. The counter module 123 is started when the input data D is read from the input register 121. The comparator unit 122 compares a counter value from the counter module 123 against a constant value W, wherein the constant value W represents the number of bits in the input data D. The counter value and the input data D are combined and provided as input to the value conversion function unit 124. The value conversion function unit 124 is configured to apply value conversion functions, such as binary codes, index codes, non-linear codes, etc. The serial conversion control function unit 120 asserts an enable signal when the counter value is less than the constant value W, and the AND unit 125 evaluates true based on a value from the value conversion function unit 124. As the counter module 123 increments the counter value, the enable signal is asserted for an appropriate number of cycles to create up an appropriate number of spike event packets, wherein W is the maximum number of spike event packets created for the input data D.

When configured in accordance with the example configuration 180 to support the time slot code, the first value a is set to zero values and the value from the value conversion function unit 124 is sent to coefficients of the second value b.

When configured in accordance with the example configuration 180 to support the position code, the second value b is set to zero values and the value from the value conversion function unit 124 is sent to coefficients of the first value a.

In one embodiment, the constant value W is set to 1, thereby removing the need to have the counter module 123 and the comparator unit 122.

FIG. 11 is an example configuration 190 for the serial conversion control function unit 120, wherein the serial conversion control function unit 120 is configured to support generation of spike event data based on the time interval code and/or the axon interval code, in accordance with an embodiment of the invention. When configured in accordance with the example configuration 190, the serial conversion control function unit 120 comprises a register 121 and an adder unit 122. When input data D arrives, the adder unit 122 adds the input data D to a previous input data maintained in the register 121, and the resulting sum is stored as new previous input data in the register 121. The serial conversion control function unit 120 also asserts an enable signal when the input data D arrives. Therefore, when configured in accordance with the example configuration 190, the serial conversion control function unit 120 generates a single spike event packet for each input data D, wherein the spike event packet is outputted at a time or space (axon) interval since a previous spike event packet, wherein the interval is based on the input data D.

When configured in accordance with the example configuration 190 to support the time interval code, the first value a is set to zero values and the new previous value from the register 121 is sent to coefficients of the second value b. The time counter in the time module 114 should also be disabled (i.e. set to 0).

When configured in accordance with the example configuration 190 to support the axon interval code, the second value b is set to zero values and the new previous value from the register 121 is sent to coefficients of the first value a.

FIG. 12 is another example configuration 195 for the serial conversion control function unit 120, wherein the serial conversion control function unit 120 is configured to support generation of spike event data based on the time interval time code and/or the axon interval code, in accordance with an embodiment of the invention. When configured in accordance with the example configuration 195, the serial conversion control function unit 120 comprises a multiplexor 121. When input data D arrives, two spike event packets are generated—a first spike event packet with a time or address offset set to zero, and a second spike event packet with a time or address offset set to the input data D. The multiplexor 121 is configured to first select a zero value and then the input data D as a time or address offset. Therefore, when configured in accordance with the example configuration 195, the serial conversion control function unit 120 generates a pair of spike events packets for each input data D, wherein the spike events packets are separated by a time interval based on the input data D.

When configured in accordance with the example configuration 195 to support the time interval code, the first value a is set to zero values and an output value from the multiplexor 121 is sent to coefficients of the second value b.

When configured in accordance with the example configuration 195 to support the axon interval code, the second value b is set to zero values and an output value from the multiplexor 121 is sent to coefficients of the first value a.

In another embodiment, the data-to-spike converter system 52 supports a parallel conversion method. For example, FIG. 13 is an example parallel configuration of a data-to-spike converter system 200, in accordance with an embodiment of the invention. The data-to-spike converter system 200 comprises a parallel conversion function unit 210 for generating spike event data. As described in detail later herein, the parallel conversion function unit 210 generates spike event data by converting digital numeric data to spike event data.

In one embodiment, the data-to-spike converter system 200 comprises only the parallel conversion function unit 210. The parallel conversion function unit 210 converts the input data D received by neurosynaptic system 50 to spike event data, and outputs the spike event data to the output bus 59 that transmits the spike event data to the core circuits 10 of the neurosynaptic system 50 for processing.

In another embodiment, the data-to-spike converter system 200 further comprises one or more optional components, such as a gain control unit 203, an input buffer unit 201, one or more schedulers 104, and one or more output buffer units 202. In one embodiment, each buffer unit 201, 202 is a FIFO buffer unit.

If the data-to-spike converter system 200 includes the gain control unit 203, the input data D received by the neurosynaptic system 50 is first scaled by the gain control unit 203. In one embodiment, the gain control unit 203 applies a transformation operation on the input data D in accordance with equation (1) provided above.

If the data-to-spike converter system 200 includes the input buffer unit 201, the input buffer unit 201 buffers the input data D/the scaled input data $D_{scale}$. The parallel conversion function unit 210 then reads data out of the input buffer unit 201 and converts the data read to spike event data. The input buffer unit 201 is necessary if the rate at which input data D arrives is faster than the rate at which the parallel conversion function unit 210 generates spike event data.

If the data-to-spike converter system 200 includes the schedulers 104, the schedulers 104 buffer spike event packets that do not include a delivery timestamp, and output the spike event packets to the output bus 59 at an appropriate time.

If the data-to-spike converter system 200 includes the output buffer units 202, the output buffer units 202 buffer spike event data before the spike event data is output to the output bus 59. The output buffer units 202 is necessary if the rate at which the parallel conversion function unit 210 generates spike event data is faster than the rate at which the output bus 59 transmits spike event data to the core circuits 10 of the neurosynaptic system 50 for processing.

Figure 14:
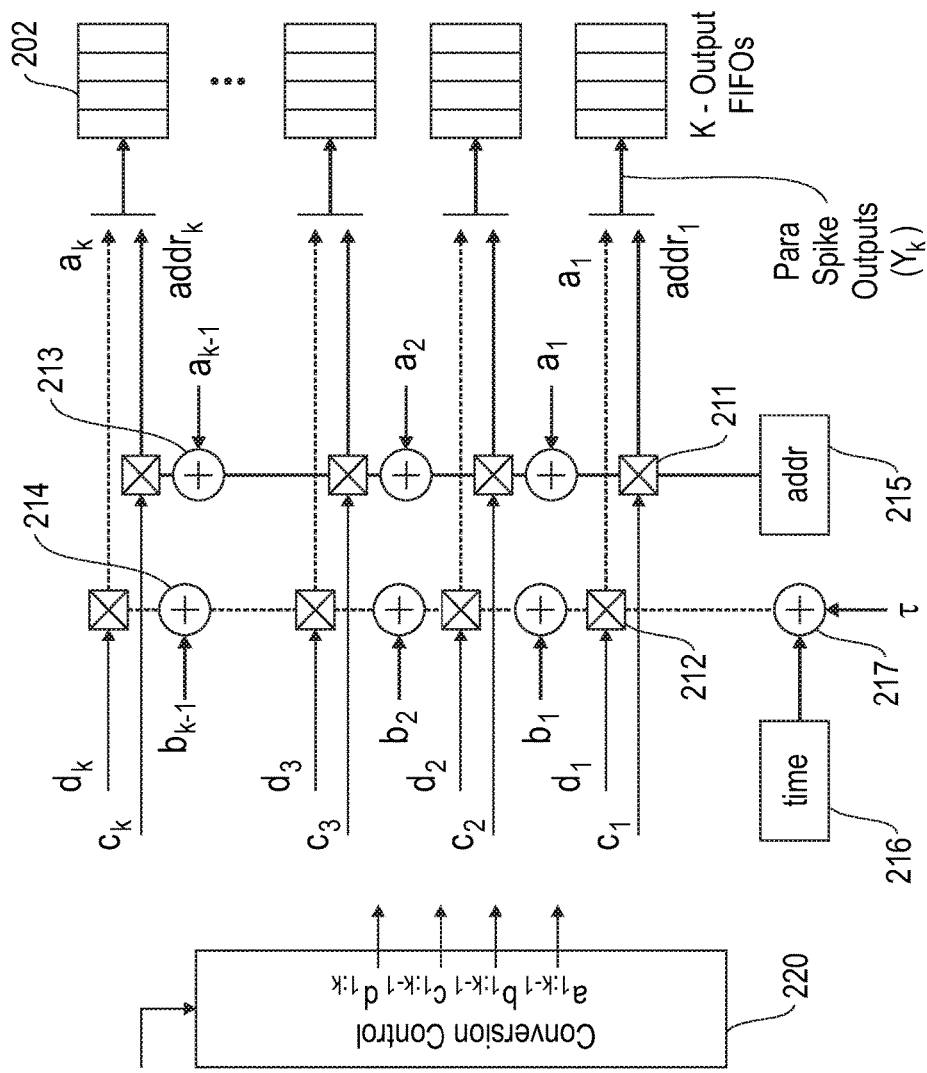
FIG. 14 illustrates a block diagram of the parallel conversion unit, in accordance with an embodiment of the invention.

FIG. 14 illustrates a block diagram of the parallel conversion unit 210, in accordance with an embodiment of the invention. The parallel conversion unit 210 comprises a conversion control block 220 for receiving input data D. Based on the input data D, the control block 220 controls address/time pairs that are sent to the output buffer units 202. Let $a_{1:K-1}$ denote an address offset coefficient for determining a relative axon address offset between adjacent outputs, let $b_{1:K-1}$ denote a time offset coefficient for determining a relative time offset between adjacent outputs, let $c_{1:K}$ denote an address crossbar enable signal for enabling address crossbar connection gates 211, and let $d_{1:K}$ denote an time crossbar enable signal for enabling time crossbar connection gates 212. As described in detail later herein, the values of $a_{1:K-1}$, $b_{1:K-1}$, $c_{1:K}$ and $d_{1:K}$ are set based on the spike code used to generate spike event packets.

Time or address is driven on to a spike output bus when the time crossbar connection gates 212 or address crossbar connection gates are turned on. An address may be stored in a register 215 or may be provided as input to the data-to-spike converter system 200 along with the input data D. A register 216 maintains a current time value that is incremented at every timestep.

The parallel conversion unit 210 further comprises a first adder unit 217 for computing a delivery timestamp $ts_0$, a second adder unit 214 for computing a $k^{th}$ delivery timestamp $ts_k$, and a third adder unit 213 for computing a $k^{th}$ target address $addr_k$.

Table 16 below provides example pseudo-code for setting the values of $a_{1:K-1}$, $b_{1:K-1}$, $c_{1:K}$ and $d_{1:K}$ to generate spike event packets based on the binary code. As shown in Table 16, each input data D triggers the output of a spike event packet on a first output channel.

TABLE 16

$a_{1:K-1} = 0$;
$b_{1:K-1} = 0$;
$c_1 = 1$;
$c_{2:K} = 0$;
$d_1 = 1$;
$d_{2:K} = 0$;

Table 17 below provides example pseudo-code for setting the values of $a_{1:K-1}$, $b_{1:K-1}$, $c_{1:K}$ and $d_{1:K}$ to generate spike event packets based on the stochastic time code. As shown in Table 17, there is a PRNG for each output channel. For each input data D, each output channel is evaluated in parallel. Specifically, each PRNG for each output channel draws a random number, and the output of a spike event packet on that output channel is triggered if the input data D is greater than the random number.

TABLE 17

$a_{1:K-1} = 0$;
$b_{1:K-1} = 1$;
if (D > $PRNG_k$),
    $c_k = 1$;
else $c_k = 0$;
if (D > $PRNG_k$),
    $d_k = 1$;
else $d_k = 0$;

Table 18 below provides example pseudo-code for setting the values of $a_{1:K-1}$, $b_{1:K-1}$, $c_{1:K}$ and $d_{1:K}$ to generate spike event packets based on the stochastic axon code. As shown in Table 18, there is a PRNG for each output channel. For each input data D, each output channel is evaluated in parallel. Specifically, each PRNG for each output channel draws a random number, and the output of a spike event packet on that output channel is triggered if the input data D is greater than the random number.

TABLE 18

$a_{1:K-1} = 1;$
$b_{1:K-1} = 0;$
if (D > PRNG$_k$),
    $c_k = 1$
else $c_k = 0;$
if (D >PRNG$_k$),
    $d_k = 1;$
else $d_k = 0;$ Table 19 below provides example pseudo-code for setting the values of $a_{1:K-1}$, $b_{1:K-1}$, $c_{1:K}$ and $d_{1:K}$ to generate spike event packets based on the burst code. As shown in Table 19, each input data D triggers D adjacent address crossbar connection gates 211 and D adjacent time crossbar connection gates 212 to turn on. Each input data D triggers the output of D spike event packets in parallel. k different delivery timestamps are computed. By setting all of the coefficients $b_k$ equal to 1, the delivery timestamp for each spike event packet on each output channel is incremented by 1.

TABLE 19

$a_{1:K-1} = 0;$
$b_{1:K-1} = 1;$
$c_{1:D} = 1;$
$c_{D+1:K} = 0;$
$d_{1:D} = 1;$
$d_{D+1:K} = 0;$

Table 20 below provides example pseudo-code for setting the values of $a_{1:K-1}$, $b_{1:K-1}$, $c_{1:K}$ and $d_{1:K}$ to generate spike event packets based on the thermometer code. As shown in Table 20, each input data D triggers D adjacent address crossbar connection gates 211 and D adjacent time crossbar connection gates 212 to turn on. Each input data D triggers the output of D spike event packets in parallel. k different target addresses are computed. By setting all of the coefficients $a_k$ equal to 1, the target address for each spike event packet on each output channel is incremented by 1.

TABLE 20

$a_{1:K-1} = 1;$
$b_{1:K-1} = 0;$
$c_{1:D} = 1;$
$c_{D+1:K} = 0;$
$d_{1:D} = 1;$
$d_{D+1:K} = 0;$

Table 21 below provides example pseudo-code for setting the values of $a_{1:K-1}$, $b_{1:K-1}$, $c_{1:K}$ and $d_{1:K}$ to generate spike event packets based on the uniform rate code. As shown in Table 21, each input data D triggers D adjacent address crossbar connection gates 211 and D adjacent time crossbar connection gates 212 to turn on. The enabled connection gates are determined by a binary vector V. Let ~V denote the logical inverse of the binary vector V. The binary vector V is read from a LUT, indexed by the input data D. Each input data D triggers the output of D spike event packets in parallel. The binary vector V selects the appropriate output channels to create an arbitrary distribution of delivery timestamps. k different delivery timestamps are computed. By setting all of the coefficients $b_k$ equal to 1, the delivery timestamp for each spike event packet on each output channel is incremented by 1.

TABLE 21

$a_{1:K-1} = 0;$
$b_{1:K-1} = 1;$
$c_V = 1;$
$c_{\sim V} = 0;$
$d_V = 1;$
$d_{\sim V} = 0;$ Table 22 below provides another example pseudo-code for setting the values of $a_{1:K-1}$, $b_{1:K-1}$, $c_{1:K}$ and $d_{1:K}$ to generate spike event packets based on the uniform rate code. As shown in Table 22, each input data D triggers D adjacent address crossbar connection gates 211 and D adjacent time crossbar connection gates 212 to turn on. $U_k$ coefficients are read in parallel from a LUT/bank of parallel LUTs, indexed by D. The $U_k$ coefficients are added to delivery timestamps. Each input data D triggers the output of D spike event packets in parallel. The values of $b_k$ are set based on the $U_k$ coefficients to create an arbitrary distribution of delivery timestamps.

TABLE 22

$a_{1:K-1} = 0;$
$b_k = U_k;$
$c_{1:D} = 1;$
$c_{D+1:K} = 0;$
$d_{1:D} = 1;$
$d_{D+1:K} = 0;$

Table 23 below provides example pseudo-code for setting the values of $a_{1:K-1}$, $b_{1:K-1}$, $c_{1:K}$ and $d_{1:K}$ to generate spike event packets based on the uniform population code. As shown in Table 23, each input data D triggers D adjacent address crossbar connection gates 211 and D adjacent time crossbar connection gates 212 to turn on. The enabled connection gates are determined by a binary vector V. Let ~V denote the logical inverse of the binary vector V. The binary vector V is read from a LUT, indexed by the input data D. Each input data D triggers the output of D spike event packets in parallel. The binary vector V selects the appropriate output channels to create an arbitrary distribution of target addresses. k different target addresses are computed. By setting all of the coefficients $a_k$ equal to 1, the target address for each spike event packet on each output channel is incremented by 1.

TABLE 23

$a_{1:K-1} = 1;$
$b_{1:K-1} = 0;$
$c_{1:D} = 1;$
$c_{D+1:K} = 0;$
$d_{1:D} = 1;$
$d_{D+1:K} = 0;$

Table 24 below provides another example pseudo-code for setting the values of $a_{1:K-1}$, $b_{1:K-1}$, $c_{1:K}$ and $d_{1:K}$ to generate spike event packets based on the uniform population code. As shown in Table 24, each input data D triggers D adjacent address crossbar connection gates 211 and D adjacent time crossbar connection gates 212 to turn on. $U_k$ coefficients are read in parallel from a LUT/bank of parallel LUTs, indexed by D. The $U_k$ coefficients are added to target addresses. Each input data D triggers the output of D spike event packets in parallel. The values of $a_k$ are set based on the $U_k$ coefficients to create an arbitrary distribution of target addresses.

TABLE 24

$$a_k = U_k;$$
$$b_{1:K-1} = 0;$$
$$c_{1:D} = 1;$$
$$c_{D+1:K} = 0;$$
$$d_{1:D} = 1;$$
$$d_{D+1:K} = 0;$$

Table 25 below provides example pseudo-code for setting the values of $a_{1:K-1}$, $b_{1:K-1}$, $c_{1:K}$ and $d_{1:K}$ to generate spike event packets based on the time-to-spike code. As shown in Table 25, each input data D triggers a single output channel to turn on. In one embodiment, the $D^{th}$ output channel is turned on.

TABLE 25

$$a_{1:K-1} = 0;$$
$$b_{1:K-1} = 1;$$
$$c_D = 1;$$
$$c_{-D} = 0;$$
$$d_D = 1;$$
$$d_{-D} = 0;$$

Table 26 below provides another example pseudo-code for setting the values of $a_{1:K-1}$, $b_{1:K-1}$, $c_{1:K}$ and $d_{1:K}$ to generate spike event packets based on the time-to-spike code. As shown in Table 26, each input data D triggers a single output channel to turn on. In one embodiment, $b_1$ of a first output channel is set to D.

TABLE 26

$$a_{1:K-1} = 0;$$
$$b_1 = D;$$
$$b_{2:K-1} = 0;$$
$$c_1 = 1;$$
$$c_{2:K} = 0;$$
$$d_1 = 1;$$
$$d_{2:K} = 0;$$

Table 27 below provides example pseudo-code for setting the values of $a_{1:K-1}$, $b_{1:K-1}$, $c_{1:K}$ and $d_{1:K}$ to generate spike event packets based on the labeled line code. As shown in Table 27, each input data D triggers a single output channel to turn on. In one embodiment, the $D^{th}$ output channel is turned on.

TABLE 27

$$a_{1:K-1} = 1;$$
$$b_{1:K-1} = 0;$$
$$c_D = 1;$$
$$c_{-D} = 0;$$
$$d_D = 1;$$
$$d_{-D} = 0;$$

Table 28 below provides another example pseudo-code for setting the values of $a_{1:K-1}$, $b_{1:K-1}$, $c_{1:K}$ and $d_{1:K}$ to generate spike event packets based on the labeled line code. As shown in Table 28, each input data D triggers a single output channel to turn on. In one embodiment, $a_1$ of a first output channel is set to D.

TABLE 28

$$a_1 = D;$$
$$a_{2:K-1} = 0;$$
$$b_{1:K-1} = 0;$$
$$c_1 = 1;$$

TABLE 28-continued $$c_{2:K} = 0;$$
$$d_1 = 1;$$
$$d_{2:K} = 0;$$

Table 29 below provides another example pseudo-code for setting the values of $a_{1:K-1}$, $b_{1:K-1}$, $c_{1:K}$ and $d_{1:K}$ to generate spike event packets based on the time slot code. As shown in Table 29, each input data D is subdivided into bits (or groups of bits), wherein each bit (or group of bits) is denoted as D[i]. Each output channel has a corresponding combinatorial/arithmetic/arbitrary function f(D[i]). If a function f(D[i]) for an $i^{th}$ output channel evaluates TRUE, the $i^{th}$ output channel is enabled. k different delivery timestamps are computed. By setting all of the coefficients $b_k$ equal to 1, the delivery timestamp for each spike event packet on each output channel is incremented by 1.

TABLE 29

$$a_{1:K-1} = 0;$$
$$b_{1:K-1} = 1;$$
if f(D[i]),
$$\quad c_i = 1;$$
else $c_i = 0;$
if f(D[i]),
$$\quad d_i = 1;$$
else $d_i = 0;$ Table 30 below provides another example pseudo-code for setting the values of $a_{1:K-1}$, $b_{1:K-1}$, $c_{1:K}$ and $d_{1:K}$ to generate spike event packets based on the position code. As shown in Table 30, each input data D is subdivided into bits (or groups of bits), wherein each bit (or group of bits) is denoted as D[i]. Each output channel has a corresponding combinatorial/arithmetic/arbitrary function f(D[i]). If a function f(D[i]) for an $i^{th}$ output channel evaluates TRUE, the $i^{th}$ output channel is enabled. k different target addresses are computed. By setting all of the coefficients $a_k$ equal to 1, the target address for each spike event packet on each output channel is incremented by 1.

TABLE 30

$$a_{1:K-1} = 1;$$
$$b_{1:K-1} = 0;$$
if f(D[i]),
$$\quad c_i = 1;$$
else $c_i = 0;$
if f(D[i]),
$$\quad d_i = 1;$$
else $d_i = 0;$ Table 31 below provides example pseudo-code for setting the values of $a_{1:K-1}$, $b_{1:K-1}$, $c_{1:K}$ and $d_{1:K}$ to generate spike event packets based on the time interval code. As shown in Table 31, each input data D triggers a single output channel to turn on, wherein the output channel is at a time offset equal to a sum of previous delivery timestamp and the input data D.

TABLE 31

$$a_{1:K-1} = 0;$$
$$b_1 = \text{prev\_time} + D;$$
$$b_{2:K-1} = 0;$$
$$c_1 = 1;$$
$$c_{2:K} = 0;$$

TABLE 31-continued $d_1 = 1;$
$d_{2:K} = 0;$

Table 32 below provides another example pseudo-code for setting the values of $a_{1:K-1}$, $b_{1:K-1}$, $c_{1:K}$ and $d_{1:K}$ to generate spike event packets based on the time interval code. As shown in Table 32, each input data D triggers the generation of two spike event packets—a first event packet on an output channel at time offset 0 and a second event packet on an output channel at time offset D.

TABLE 32

$a_{1:K-1} = 0;$
$b_1 = D;$
$b_{2:K-1} = 0;$
$c_{1:2} = 1;$
$c_{3:K} = 0;$
$d_{1:2} = 1;$
$d_{3:K} = 0;$

Table 33 below provides example pseudo-code for setting the values of $a_{1:K-1}$, $b_{1:K-1}$, $c_{1:K}$ and $d_{1:K}$ to generate spike event packets based on the axon interval code. As shown in Table 33, each input data D triggers a single output channel to turn on, wherein the output channel is at a an address offset equal to a sum of previous target address and the input data D.

TABLE 33

$a_1 = \text{prev\_axon} + D;$
$a_{2:K-1} = 0;$
$b_{1:K-1} = 0;$
$c_1 = 1;$
$c_{2:K} = 0;$
$d_1 = 1;$
$d_{2:K} = 0;$ Table 34 below provides another example pseudo-code for setting the values of $a_{1:K-1}$, $b_{1:K-1}$, $c_{1:K}$ and $d_{1:K}$ to generate spike event packets based on the axon interval code. As shown in Table 34, each input data D triggers the generation of two spike event packets—a first event packet on an output channel at address offset 0 and a second event packet on an output channel at address offset D.

TABLE 34

$a_1 = D;$
$a_{2:K-1} = 0;$
$b_{1:K-1} = 0;$
$c_{1:2} = 1;$
$c_{3:K} = 0;$
$d_{1:2} = 1;$
$d_{3:K} = 0;$

Figure 15A:
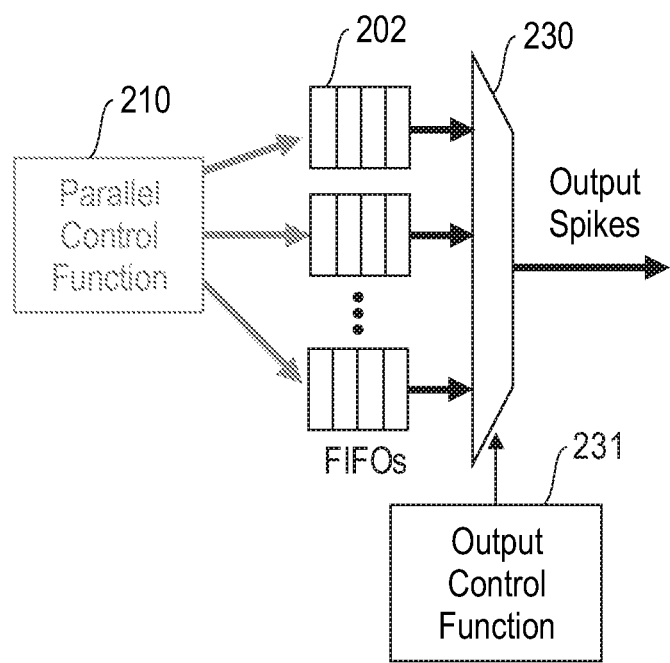
FIG. 15A illustrates an example output multiplexor for output spike event packets from the data-to-spike converter system in FIG. 13, in accordance with an embodiment of the invention.

FIG. 15A illustrates an example output multiplexor 230 for output spike event packets from the data-to-spike converter system 200 in FIG. 13, in accordance with an embodiment of the invention. The multiplexor 230 may be used to read output spike event packets from any of the output buffer units 202, and write out the output spike event packets to a single output port. The multiplexor 230 is controlled by a control signal provided by an output control function unit 231, wherein the control signal controls the order with which the output buffer units 202 are read out. The output control function 231 may implement many different arbitration algorithms (e.g., round-robin, weighted, adaptive, random, FIFO, time-division, etc.) to shape the flow of the output spike event packets.

In one embodiment, input data D to the data-to-spike converter 52 may be delta encoded prior to converting the input data D to spike event data. For example, if an input data value in the current time step is different from an input data value in the previous time step, the input data D is the difference between the two input data values.

In one embodiment, input data D to the data-to-spike converter 52 may be toggle encoded prior to converting the input data D to spike event data. For example, if an input data value in the current time step is different from an input data value in the previous time step, the input data D is the binary value true; otherwise, the input data D is the binary value false.

In one embodiment, input data D to the data-to-spike converter 52 may be offset to have only a positive range, and may be sent with different addresses for positive and negative data.

In one embodiment, input data D to the data-to-spike converter 52 may be variance encoded. For example, each input data word is converted to a series of data samples that have variance equal to the input data word. Each data sample is then converted to a spike event packet.

In this specification, let X denote output spike event data generated by the core circuits 10 of the neurosynaptic system 50. As stated above, the spike-to-data converter system 350 converts spike event data X generated by the core circuits 10 to external output data Y, wherein the output data Y includes digital numeric data. The spike-to-data converter system 350 is configurable to support different spike codes.

Figure 15B:
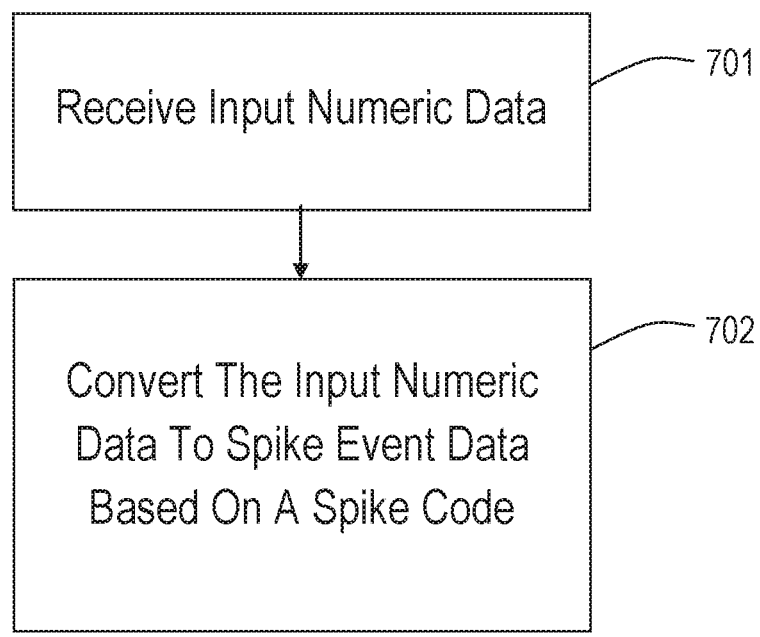
FIG. 15B illustrates a flowchart of an example process utilizing a data-to-spike converter system, in accordance with an embodiment of the invention.

FIG. 15B illustrates a flowchart of an example process 700 utilizing a data-to-spike converter system, in accordance with an embodiment of the invention. In process block 701 receive input numeric data. In process block 702, convert the input numeric data to spike event data based on a spike code.

Figure 16:
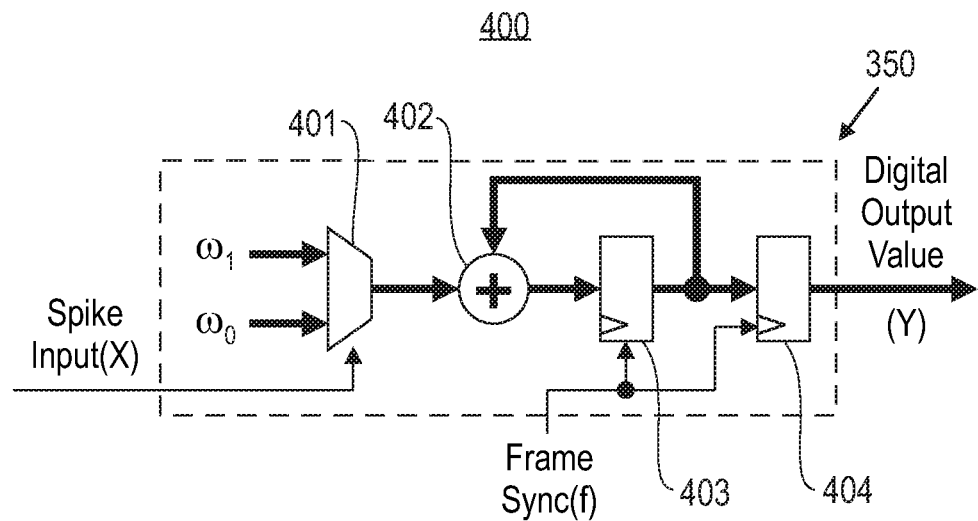
FIG. 16 is an example configuration for the spike-to-data converter system, wherein the spike-to-data converter system is configured to support the stochastic time code, the uniform rate code, the arbitrary rate code, the burst code, the stochastic axon code, the uniform population code, the arbitrary population code, and/or the thermometer code, in accordance with an embodiment of the invention.

FIG. 16 is an example configuration 400 for the spike-to-data converter system 350, wherein the spike-to-data converter system 350 is configured to support the stochastic time code, the uniform rate code, the arbitrary rate code, the burst code, the stochastic axon code, the uniform population code, the arbitrary population code, and/or the thermometer code, in accordance with an embodiment of the invention. When configured in accordance with the example configuration 400, the spike-to-data converter system 350 comprises a multiplexor 401, an integrator unit 402, a first register unit 403, and a second register unit 404.

When the spike-to-data converter system 350 receives spike event data X, the multiplexor 401 selects between a first programmable weight $\omega_1$ and a second programmable weight $\omega_0$, wherein the second programmable weight $\omega_0$ is a default programmable weight. The integration unit 402 adds the programmable weight selected by the multiplexor 401 to an accumulated value maintained in the first register unit 403, and stores the resulting sum in the first register unit 403. A frame synchronization pulse f outputs the accumulated value, latches it to the second register unit 404, and resets the accumulated value maintained in the first register unit 403. When configured in accordance with the example configuration 400, the spike-to-data converter system 350 generates output data Y represented by equation (4) below:

$$Y(f) = \text{sum}\{t=1:T\}\omega_1 X(t) + \omega_0(1-X(t)) \quad (4),$$

wherein X(t) is an indicator function that is set to 1 when a spike is present at time t, and set to 0 otherwise.

Figure 17:
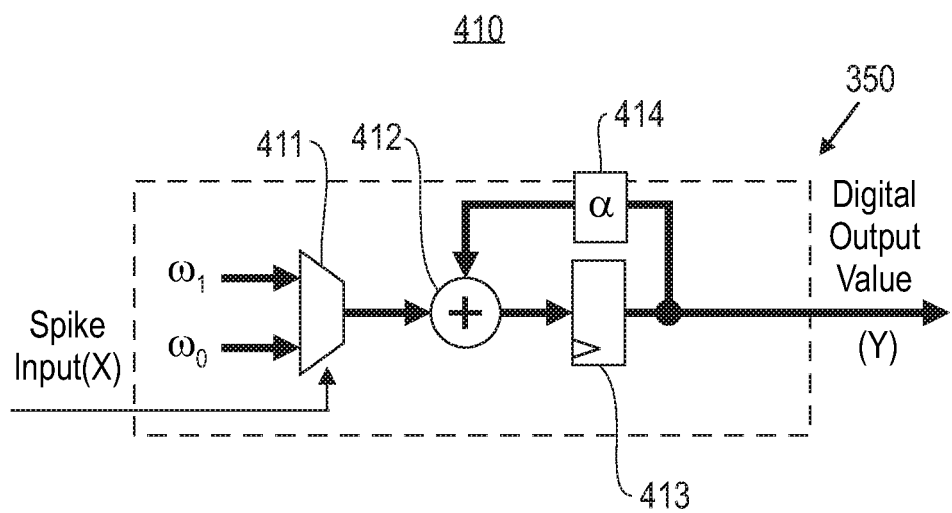
FIG. 17 is an example configuration for the spike-to-data converter system, wherein the spike-to-data converter system is configured to support the stochastic time code, the uniform rate code, the arbitrary rate code, the burst code, the stochastic axon code, the uniform population code, the arbitrary population code, and/or the thermometer code, and wherein the spike-to-data converter system implements an infinite impulse response (IIR) filter, in accordance with an embodiment of the invention.

FIG. 17 is an example configuration 410 for the spike-to-data converter system 350, wherein the spike-to-data converter system 350 is configured to support the stochastic time code, the uniform rate code, the arbitrary rate code, the burst code, the stochastic axon code, the uniform population code, the arbitrary population code, and/or the thermometer code, and wherein the spike-to-data converter system 350 implements an infinite impulse response (IIR) filter, in accordance with an embodiment of the invention. When configured in accordance with the example configuration 410, the spike-to-data converter system 350 comprises a multiplexor 411, an integrator unit 412, a first register unit 413, and a scaling unit 414.

When the spike-to-data converter system 350 receives spike event data X, the multiplexor 411 selects between a first programmable weight $\omega_1$ and a second programmable weight $\omega_0$, wherein the second programmable weight $\omega_0$ is a default programmable weight. The scaling unit 414 multiplies an accumulated value maintained in the first register unit 413 by a constant value a, wherein the constant value $\alpha<1$. The integration unit 412 adds the programmable weight selected by the multiplexor 411 to the scaled accumulated value, and stores the resulting sum in the first register unit 413. The accumulated value in the first register unit 413 is output as output data Y. When configured in accordance with the example configuration 410, the spike-to-data converter system 350 generates output data Y represented by equation (5) below:

$$Y(t)=\alpha Y(t-1)+\omega_1 X(t)+\omega_0(1-X(t)) \quad (5),$$

wherein X(t) is an indicator function that is set to 1 when a spike is present at time t, and set to 0 otherwise.

Figure 18:
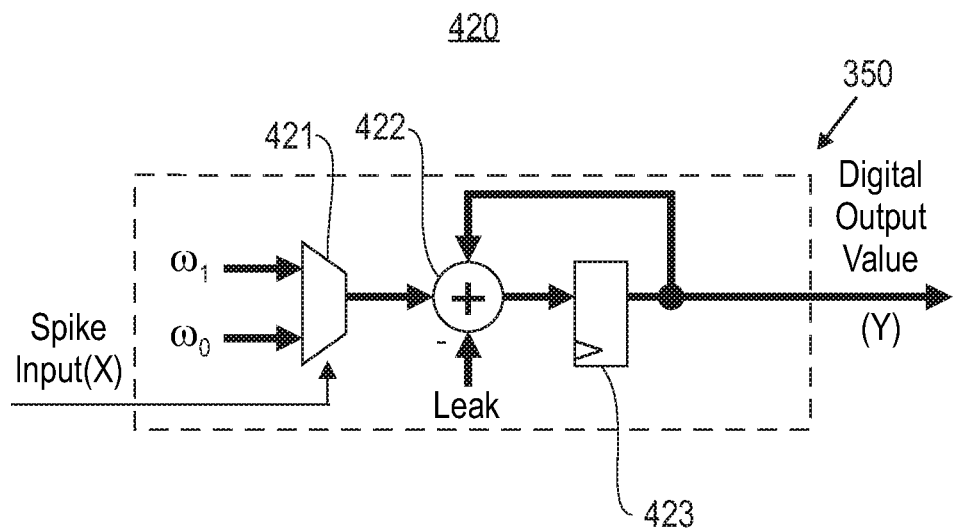
FIG. 18 is an example configuration for the spike-to-data converter system, wherein the spike-to-data converter system is configured to support the stochastic time code, the uniform rate code, the arbitrary rate code, the burst code, the stochastic axon code, the uniform population code, the arbitrary population code, and/or the thermometer code, and wherein the spike-to-data converter system implements a leaky integrator, in accordance with an embodiment of the invention.

FIG. 18 is an example configuration 420 for the spike-to-data converter system 350, wherein the spike-to-data converter system 350 is configured to support the stochastic time code, the uniform rate code, the arbitrary rate code, the burst code, the stochastic axon code, the uniform population code, the arbitrary population code, and/or the thermometer code, and wherein the spike-to-data converter system 350 implements a leaky integrator, in accordance with an embodiment of the invention. When configured in accordance with the example configuration 420, the spike-to-data converter system 350 comprises a multiplexor 421, an integrator unit 422 and a first register unit 423.

When the spike-to-data converter system 350 receives spike event data X, the multiplexor 421 selects between a first programmable weight $\omega_1$ and a second programmable weight $\omega_0$, wherein the second programmable weight $\omega_0$ is a default programmable weight. The integration unit 422 adds the programmable weight selected by the multiplexor 421 to an accumulated value maintained in the first register unit 423, subtracts a leak value, and stores the resulting value in the first register unit 423. The accumulated value in the first register unit 413 is output as output data Y. When configured in accordance with the example configuration 420, the spike-to-data converter system 350 generates output data Y represented by equation (6) below:

$$Y(t)=\alpha Y(t-1)+\omega_1 X(t)+\omega_0(1-X(t))-\text{leak} \quad (6),$$

wherein X(t) is an indicator function that is set to 1 when a spike is present at time t, and set to 0 otherwise.

Figure 19:
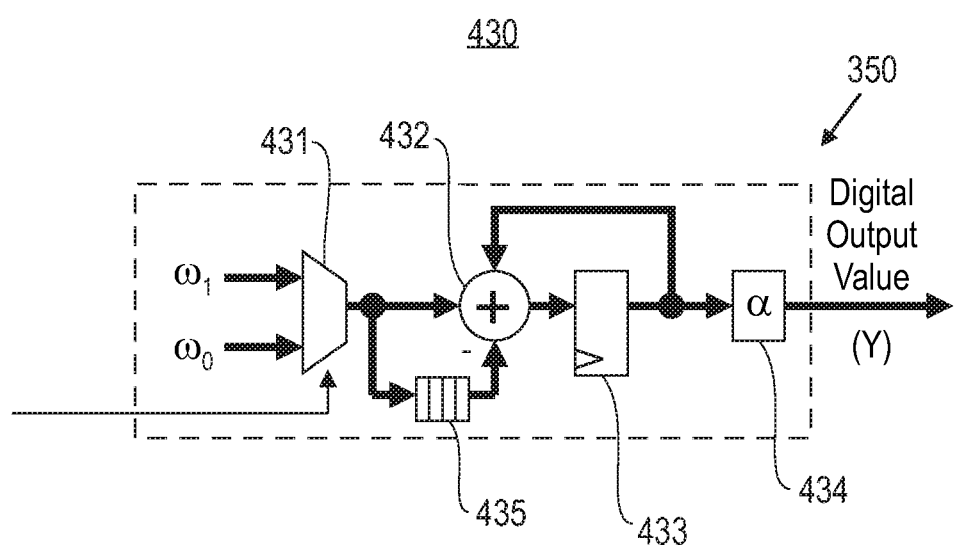
FIG. 19 is an example configuration for the spike-to-data converter system, wherein the spike-to-data converter system is configured to support the stochastic time code, the uniform rate code, the arbitrary rate code, the burst code, the stochastic axon code, the uniform population code, the arbitrary population code, and/or the thermometer code, and wherein the spike-to-data converter system implements a moving average filter, in accordance with an embodiment of the invention.

FIG. 19 is an example configuration 430 for the spike-to-data converter system 350, wherein the spike-to-data converter system 350 is configured to support the stochastic time code, the uniform rate code, the arbitrary rate code, the burst code, the stochastic axon code, the uniform population code, the arbitrary population code, and/or the thermometer code, and wherein the spike-to-data converter system 350 implements a moving average filter, in accordance with an embodiment of the invention. When configured in accordance with the example configuration 430, the spike-to-data converter system 350 comprises a multiplexor 431, an integrator unit 432, a first register unit 433, a FIFO buffer unit 435, and a scaling unit 434.

When the spike-to-data converter system 350 receives spike event data X, the multiplexor 431 selects between a first programmable weight $\omega_1$ and a second programmable weight $\omega_0$, wherein the second programmable weight $\omega_0$ is a default programmable weight. The FIFO buffer unit 435 stores N previous input samples from the multiplexor 431. In each cycle, one input sample enters the FIFO buffer unit 435 and another input sample is read/removed from the FIFO buffer unit 435. The integration unit 432 adds the programmable weight selected by the multiplexor 411 to an accumulated value maintained in the first register unit 433, subtracts an $N^{th}$ input sample from the FIFO buffer unit 435, and stores the resulting value in the first register unit 433. The scaling unit 434 multiplies the accumulated value maintained in the first register unit 433 by a constant value $\alpha$, wherein the constant value $\alpha=1/N$. The scaled accumulated value is output as output data Y. When configured in accordance with the example configuration 430, the spike-to-data converter system 350 generates output data Y represented by equation (7) below:

$$Y(t)=\alpha\text{sum}\{n=0:N-1\}\omega 1 X(t-n)+\omega 0(1-X(t)) \quad (7),$$

wherein X(t) is an indicator function that is set to 1 when a spike is present at time t, and set to 0 otherwise.

Figure 20:
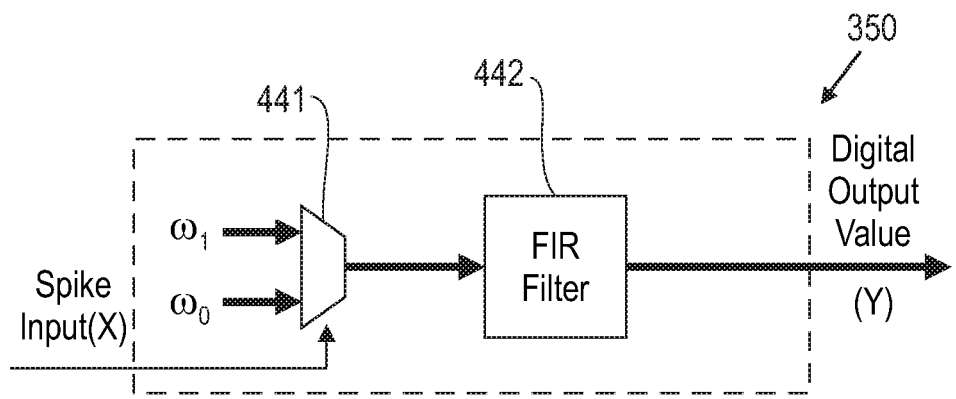
FIG. 20 is an example configuration for the spike-to-data converter system, wherein the spike-to-data converter system is configured to support the stochastic time code, the uniform rate code, the arbitrary rate code, the burst code, the stochastic axon code, the uniform population code, the arbitrary population code, and/or the thermometer code, and wherein the spike-to-data converter system implements a finite impulse response (FIR) filter, in accordance with an embodiment of the invention.

FIG. 20 is an example configuration 440 for the spike-to-data converter system 350, wherein the spike-to-data converter system 350 is configured to support the stochastic time code, the uniform rate code, the arbitrary rate code, the burst code, the stochastic axon code, the uniform population code, the arbitrary population code, and/or the thermometer code, and wherein the spike-to-data converter system 350 implements a finite impulse response (FIR) filter, in accordance with an embodiment of the invention. When configured in accordance with the example configuration 440, the spike-to-data converter system 350 comprises a multiplexor 441 and FIR filter unit 442.

When the spike-to-data converter system 350 receives spike event data X, the multiplexor 441 selects between a first programmable weight $\omega_1$ and a second programmable weight $\omega_0$, wherein the second programmable weight $\omega_0$ is a default programmable weight. The input samples from the multiplexor 441 are processed by the FIR filter unit 442, and an output value from the FIR filter unit 442 is output as output data Y. When configured in accordance with the example configuration 440, the spike-to-data converter system 350 generates output data Y represented by equation (8) below:

$$Y(t)=\text{sum}\{n=0:N-1\}c(n)[(\omega_1 X(t-n)+\omega_0(1-X(t-n))] \quad (8),$$

where c(n) are FIR filter coefficients, and wherein X(t) is an indicator function that is set to 1 when a spike is present at time t, and set to 0 otherwise.

Figure 21:
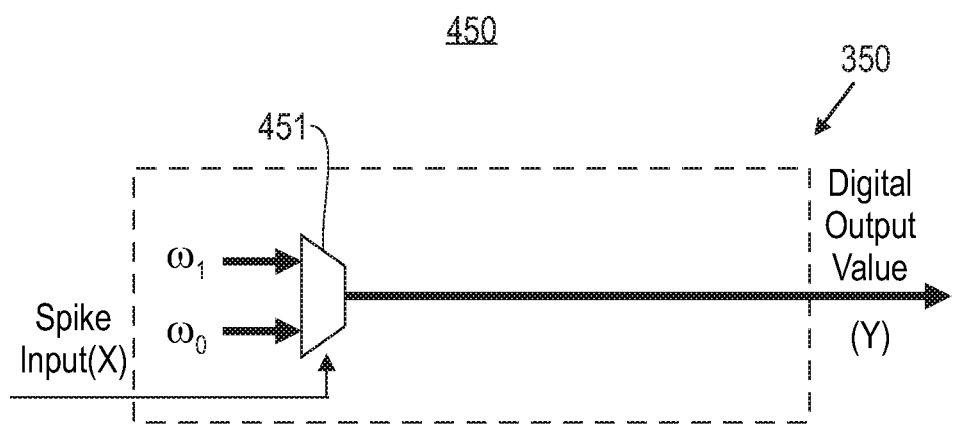
FIG. 21 is an example configuration for the spike-to-data converter system, wherein the spike-to-data converter system is configured to support the binary code, in accordance with an embodiment of the invention.

FIG. 21 is an example configuration 450 for the spike-to-data converter system 350, wherein the spike-to-data converter system 350 is configured to support the binary code, in accordance with an embodiment of the invention. When configured in accordance with the example configuration 450, the spike-to-data converter system 350 comprises a multiplexor 451.

When the spike-to-data converter system 350 receives spike event data X, the multiplexor 451 selects between a first programmable weight $\omega_1$ and a second programmable weight $\omega_0$, wherein the second programmable weight $\omega_0$ is a default programmable weight. The programmable weight selected by the multiplexor 451 is output as output data Y. When configured in accordance with the example configuration 450, the spike-to-data converter system 350 generates output data Y represented by equation (9) below:

$$Y(t)=\omega_1 X(t)+\omega_0(1-X(t)) \qquad (9),$$

wherein X(t) is an indicator function that is set to 1 when a spike is present at time t, and set to 0 otherwise.

Figure 22:
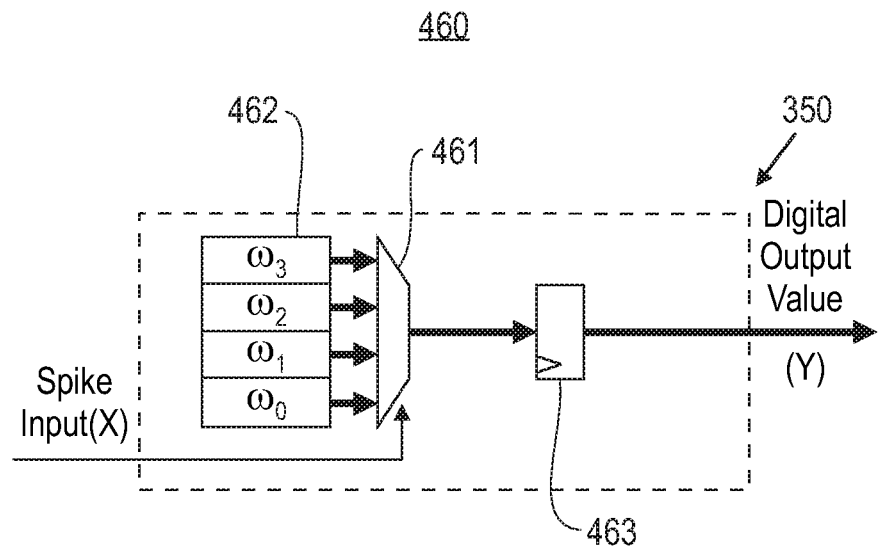
FIG. 22 is an example configuration for the spike-to-data converter system, wherein the spike-to-data converter system is configured to support the labeled line code, in accordance with an embodiment of the invention.

FIG. 22 is an example configuration 460 for the spike-to-data converter system 350, wherein the spike-to-data converter system 350 is configured to support the labeled line code, in accordance with an embodiment of the invention. When configured in accordance with the example configuration 460, the spike-to-data converter system 350 comprises a multiplexor 461, a storage unit 462, and a first register unit 463. The storage unit 462 stores multiple programmable weights at different addresses. The storage unit 462 may be a RAM, a LUT or a register file.

When the spike-to-data converter system 350 receives spike event data X, a portion $A_x$ of an address included in the spike event data X is used to address a programmable weight maintained at location $A_x$ of the storage unit 462. A corresponding programmable weight $\omega[A_x]$ is latched to the first register unit 463 until another spike event data X is received. The programmable weight $\omega[A_x]$ is output as output data Y. When configured in accordance with the example configuration 460, the spike-to-data converter system 350 generates output data Y represented by equation (10) below:

$$Y(t)=\omega[A_x] \qquad (10).$$

Figure 23:
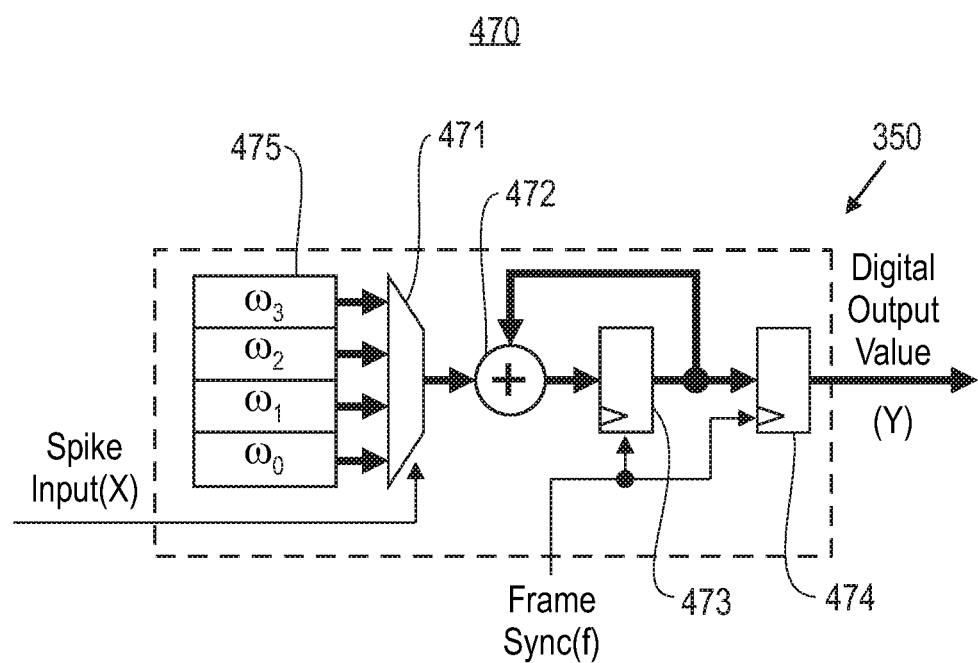
FIG. 23 is an example configuration for the spike-to-data converter system, wherein the spike-to-data converter system is configured to support the time slot code and/or the position code, in accordance with an embodiment of the invention.

FIG. 23 is an example configuration 470 for the spike-to-data converter system 350, wherein the spike-to-data converter system 350 is configured to support the time slot code and/or the position code, in accordance with an embodiment of the invention. When configured in accordance with the example configuration 470, the spike-to-data converter system 350 comprises a multiplexor 471, a storage unit 475, an integrator unit 472, a first register unit 473 and a second register unit 474. The storage unit 475 stores multiple programmable weights at different addresses. The storage unit 475 may be a RAM, a LUT or a register file.

When the spike-to-data converter system 350 receives spike event data X, a portion $A_x$ of an address included in the spike event data X is used to address a programmable weight maintained at location $A_x$ of the storage unit 475. The integrator unit 472 adds a corresponding programmable weight $\omega[A_x]$ to an accumulated value maintained in the first register unit 463, and the resulting sum is stored in the first register unit 473. A frame synchronization signal f outputs the accumulated value maintained in the first register unit 473, latches it to the second input register 474, and resets the accumulated value in the first register unit 473. When configured in accordance with the example configuration 470, the spike-to-data converter system 350 generates output data Y represented by equation (11) below:

$$Y(t)=\text{sum}\{i=1:\}\omega[A_x(i)] \qquad (11).$$

Figure 24:
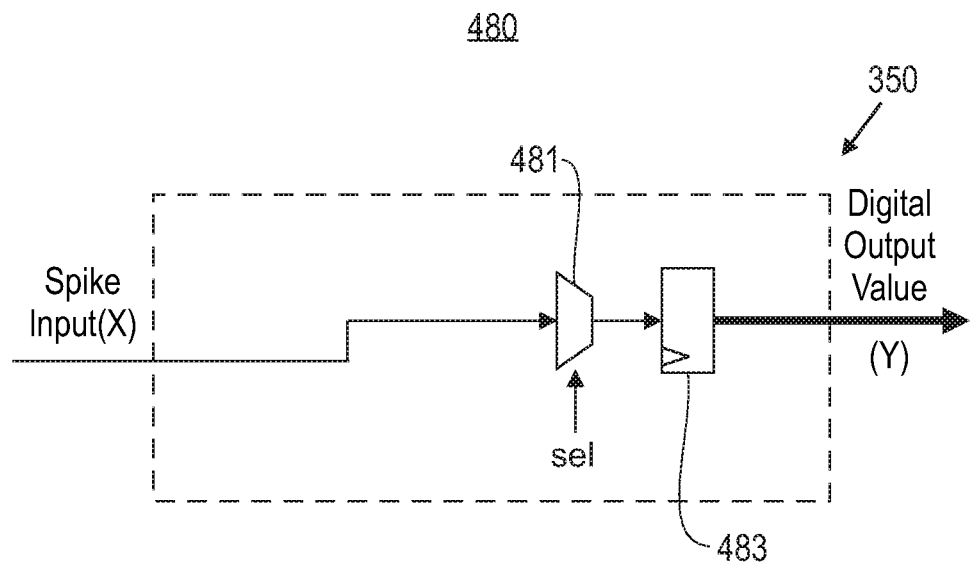
FIG. 24 is an example configuration for the spike-to-data converter system, wherein the spike-to-data converter system is configured to support the payload code, in accordance with an embodiment of the invention.

FIG. 24 is an example configuration 480 for the spike-to-data converter system 350, wherein the spike-to-data converter system 350 is configured to support the payload code, in accordance with an embodiment of the invention. In the payload code, spike event data includes a digital value (i.e., a payload) that represents output data. When configured in accordance with the example configuration 480, the spike-to-data converter system 350 comprises a multiplexor 481 and a first register unit 483.

When the spike-to-data converter system 350 receives spike event data X, a portion $A_x$ of an address included in the spike event data X is selected. The selected bits are latched to the first register unit 483 until another spike event data X is received. When configured in accordance with the example configuration 480, the spike-to-data converter system 350 generates output data Y represented by equation (12) below:

$$Y(t)=AX[sel0:sel1] \qquad (12).$$

Figure 25:
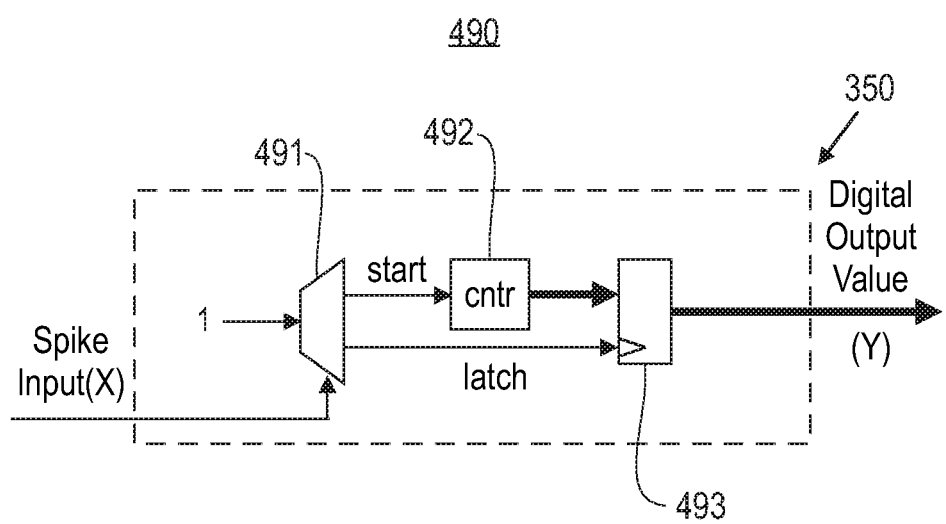
FIG. 25 is an example configuration for the spike-to-data converter system, wherein the spike-to-data converter system is configured to support the inter-spike interval code, in accordance with an embodiment of the invention.

FIG. 25 is an example configuration 490 for the spike-to-data converter system 350, wherein the spike-to-data converter system 350 is configured to support the inter-spike interval code, in accordance with an embodiment of the invention. In the inter-spike interval code, spikes are sent such that a temporal interval between spikes is proportional to an input value. When configured in accordance with the example configuration 490, the spike-to-data converter system 350 comprises a multiplexor 491, a counter 492 and a first register unit 493.

When the spike-to-data converter system 350 receives spike event data X, the spike event data X are addressed to one of two locations. $A_{X0}$ is a spike address to start the counter 492, and $A_{X1}$ is a spike address to latch the counter 492. The multiplexor 491 decodes the incoming spike address, and the counter 492 counts time. When a spike to address $A_{X0}$ arrives, the counter 492 starts. When a spike to address $A_{X1}$ arrives, a counter value from the counter 492 is stored in the first register unit 493. When configured in accordance with the example configuration 490, the spike-to-data converter system 350 generates output data Y represented by equation (13) below:

$$Y(t)=T(A_{X1})-T(A_{X0}) \qquad (13).$$

Figure 26:
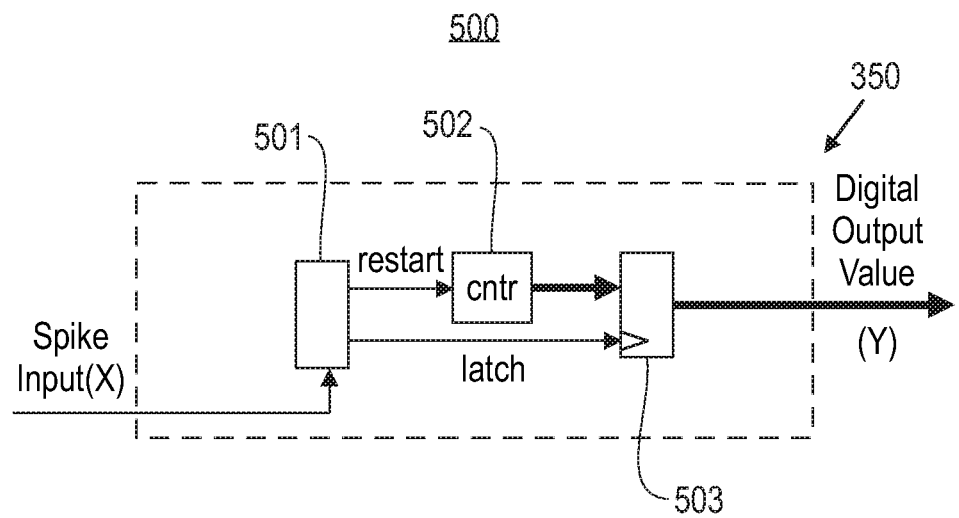
FIG. 26 is another example configuration for the spike-to-data converter system, wherein the spike-to-data converter system is configured to support the inter-spike interval code, in accordance with an embodiment of the invention.

FIG. 26 is another example configuration 500 for the spike-to-data converter system 350, wherein the spike-to-data converter system 350 is configured to support the inter-spike interval code, in accordance with an embodiment of the invention. When configured in accordance with the example configuration 500, the spike-to-data converter system 350 comprises a multiplexor 501, a counter 502 and a first register unit 503. The counter 502 counts time.

When the spike-to-data converter system 350 receives spike event data X, a counter value from the counter 502 is stored in the first register unit 503. The counter 502 is also restarted at that time. When configured in accordance with the example configuration 500, the spike-to-data converter system 350 generates output data Y represented by equation (14) below:

$$Y(t)=T(X_1)-T(X_0) \qquad (14),$$

where $T(X_1)$ is the time of the previous spike, and wherein $T(X_1)$ is the time of the current spike event data X.

Figure 27:
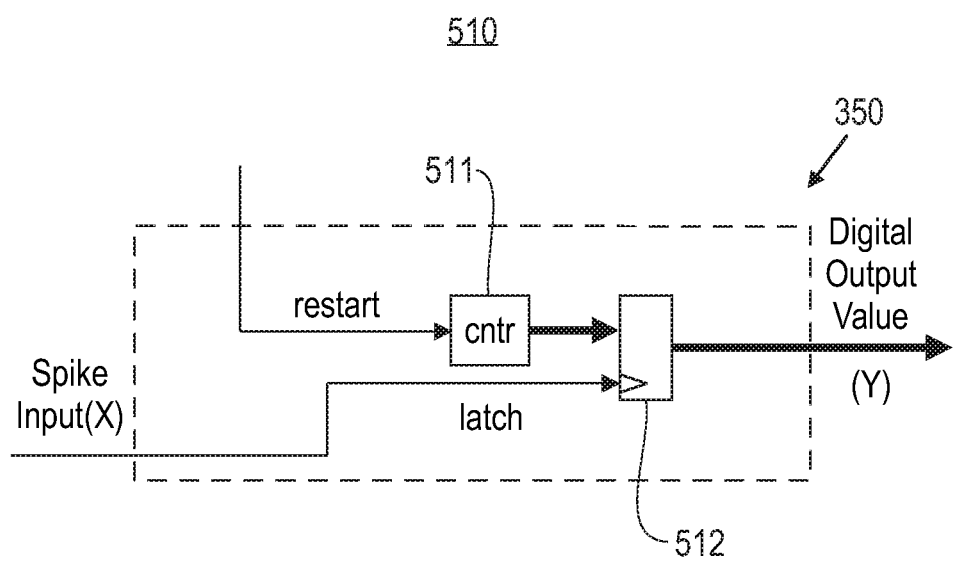
FIG. 27 is an example configuration for the spike-to-data converter system, wherein the spike-to-data converter system is configured to support the time-to-spike code, in accordance with an embodiment of the invention.

FIG. 27 is an example configuration 510 for the spike-to-data converter system 350, wherein the spike-to-data converter system 350 is configured to support the time-to-spike code, in accordance with an embodiment of the invention. When configured in accordance with the example configuration 510, the spike-to-data converter system 350 comprises a counter 511 and a first register unit 513. The counter 511 counts time.

When the spike-to-data converter system 350 receives spike event data X, a counter value from the counter 511 is stored in the first register unit 513. The counter 511 is restarted by an external sync signal. When configured in accordance with the example configuration 510, the spike-to-data converter system 350 generates output data Y represented by equation (15) below:

$$Y(t)=T(X)-T(\text{restart}) \tag{15}$$

wherein restart is the external sync signal.

Figure 28:
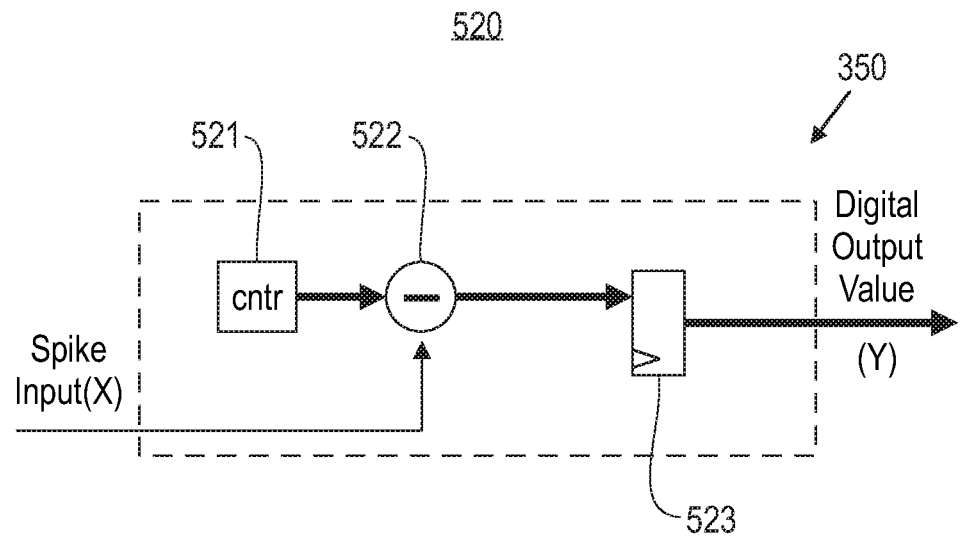
FIG. 28 is another example configuration for the spike-to-data converter system, wherein the spike-to-data converter system is configured to support the time-to-spike code, in accordance with an embodiment of the invention.

FIG. 28 is another example configuration 520 for the spike-to-data converter system 350, wherein the spike-to-data converter system 350 is configured to support the time-to-spike code, in accordance with an embodiment of the invention. When configured in accordance with the example configuration 520, the spike-to-data converter system 350 comprises a counter 521, a subtractor unit 522 and a first register unit 523. The counter 521 counts time.

When the spike-to-data converter system 350 receives spike event data X, the subtractor unit 522 subtracts a current time value from a time in a spike timestamp field of the spike event data X. When configured in accordance with the example configuration 520, the spike-to-data converter system 350 generates output data Y represented by equation (16) below:

$$Y(t)=T(\text{current})-ts_X \tag{16}$$

wherein $ts_X$ is the timestamp in the spike event data X.

Figure 29:
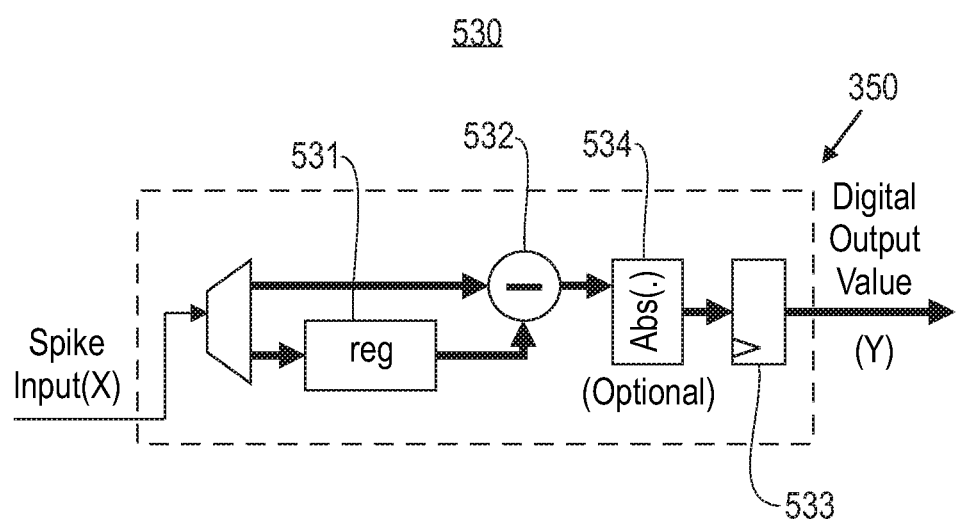
FIG. 29 is an example configuration for the spike-to-data converter system, wherein the spike-to-data converter system is configured to support the axon interval code, in accordance with an embodiment of the invention.

FIG. 29 is an example configuration 530 for the spike-to-data converter system 350, wherein the spike-to-data converter system 350 is configured to support the axon interval code, in accordance with an embodiment of the invention. When configured in accordance with the example configuration 530, the spike-to-data converter system 350 comprises a first register unit 531, a subtractor unit 532, and absolute value unit 534, and a second register unit 533.

Spike event data X arrive at the spike-to-data converter system 350 in pairs of spike event packets. A first spike address $A_{X0}$ is stored in the first register unit 531. The subtractor unit 532 computes a difference between the first spike address $A_{X0}$ and a second spike address $A_{X1}$. Optionally, an absolute value of the difference is determined using the absolute value unit 534. The difference is then stored in the second register unit 533 and output as output data Y. When configured in accordance with the example configuration 530, the spike-to-data converter system 350 generates output data Y represented by equation (17) below:

$$Y(t)=\text{abs}(A_{X1}-A_{X0}) \tag{17}$$

where $A_{X0}$ is the first spike address in a pair, and wherein $A_{X1}$ is the second spike address in a pair.

Figure 30:
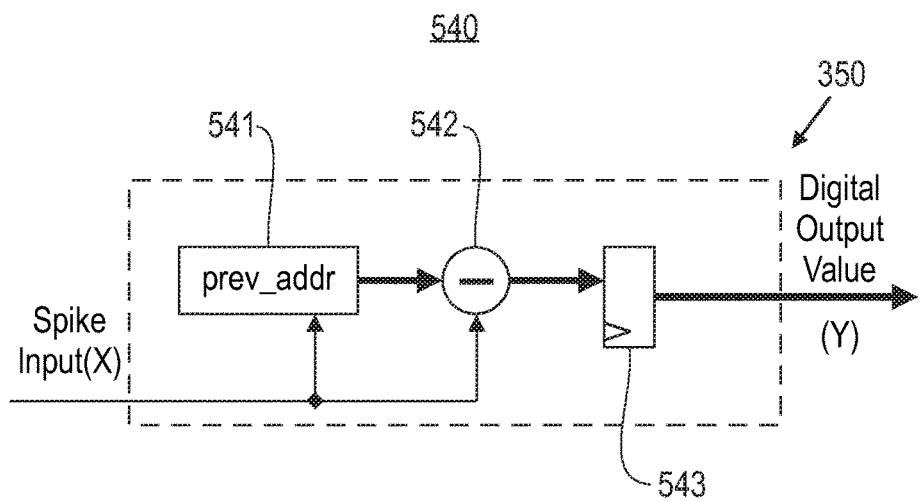
FIG. 30 is another example configuration for the spike-to-data converter system, wherein the spike-to-data converter system is configured to support the axon interval code, in accordance with an embodiment of the invention.

FIG. 30 is another example configuration 540 for the spike-to-data converter system 350, wherein the spike-to-data converter system 350 is configured to support the axon interval code, in accordance with an embodiment of the invention. When configured in accordance with the example configuration 540, the spike-to-data converter system 350 comprises an address register unit 541, a subtractor unit 542 and an output register unit 543.

When the spike-to-data converter system 350 receives spike event data X, the subtractor unit 542 subtracts a previous spike address $A(X_o)$ maintained in the address register unit 541 from a current spike address $A(X_1)$. The difference is stored in the output register unit 543 and output as the output data Y. The current spike address $A(X_1)$ is stored as the new previous spike address $A(X_o)$ in the address register unit 541. When configured in accordance with the example configuration 540, the spike-to-data converter system 350 generates output data Y represented by equation (18) below:

$$Y(t)=A_{X1}-A_{X0} \tag{18}$$

where $A_{X0}$ is the first spike address in a pair, and wherein $A_{X1}$ is the second spike address in a pair.

Figure 31:
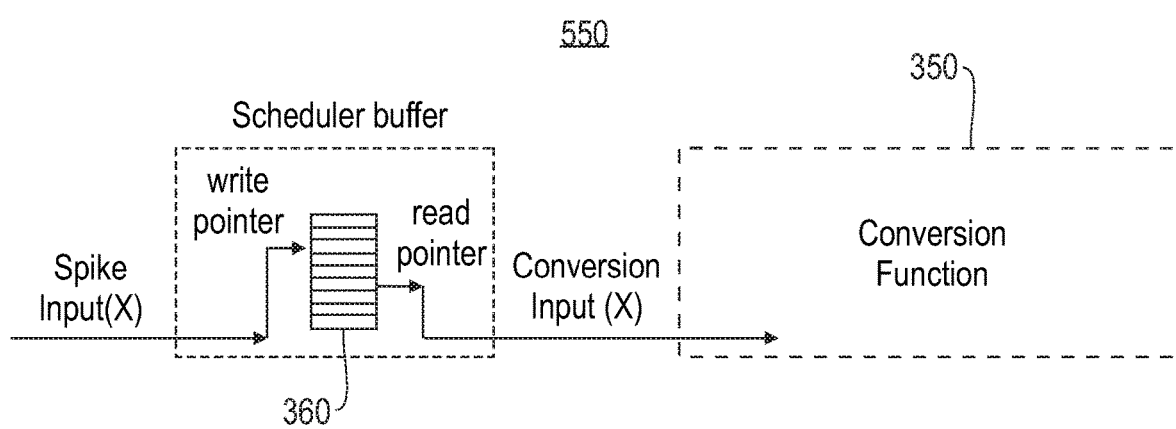
FIG. 31 is an example input scheduler buffer for the spike-to-data converter system, in accordance with an embodiment of the invention.

FIG. 31 is an example input scheduler buffer 550 for the spike-to-data converter system 350, in accordance with an embodiment of the invention. Based on a delivery timestamp specified in spike event data X, the input scheduler buffer 550 including a memory unit 360 transmits the spike event data X to the spike-to-data converter system 350 at the appropriate time. A write pointer for the input scheduler buffer 550 is set to $ts_X$, wherein $ts_X$ is the delivery timestamp in the spike event data X. A read pointer for the input scheduler buffer 550 is based on current time.

Figure 32:
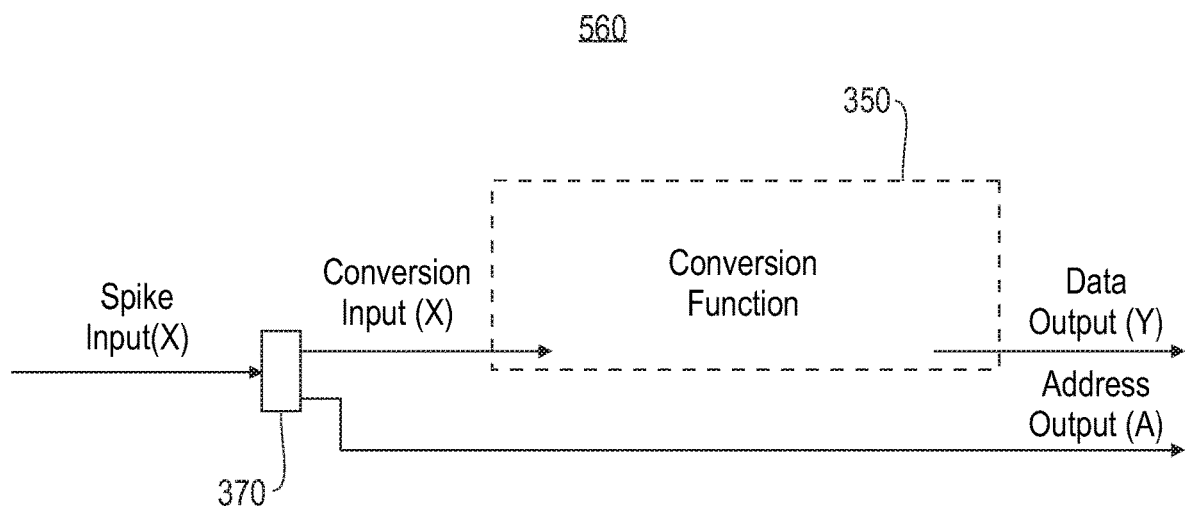
FIG. 32 is an example address passing system for the spike-to-data converter system, in accordance with an embodiment of the invention.

FIG. 32 is an example address passing system 560 for the spike-to-data converter system 350, in accordance with an embodiment of the invention. The address passing system 560 comprises a unit 370 for passing an address along with digital data. A portion of bits from spike event data X are sent to the spike-to-data converter system 350. A portion of bits from the spike event data X are sent as address output A. The address output A is the destination address of output data D. In one example implementation, the address output A is the address of an external motor/actuator module, or the address of a control function within an external motor/actuator module.

Figure 33:
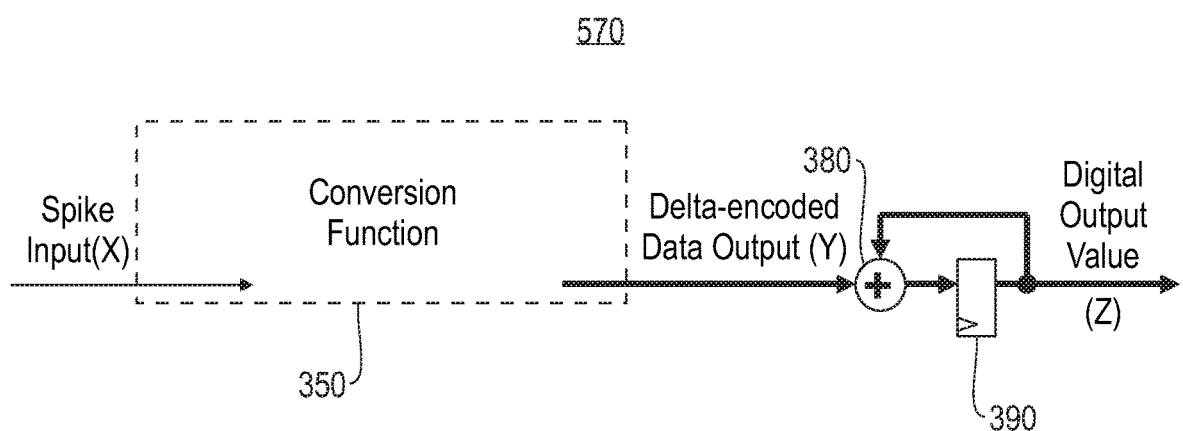
FIG. 33 is an example delta code system for the spike-to-data converter system, in accordance with an embodiment of the invention.

FIG. 33 is an example delta code system 570 for the spike-to-data converter system 350, in accordance with an embodiment of the invention. In one embodiment, the spike-to-data converter system 350 outputs delta-encoded output data Y. The delta code system 570 comprises an adder unit 380 and an output register unit 390. For each delta-encoded output data Y, the adder unit 380 adds the output data Y to a previous output data Z maintained in the output register unit 390. The resulting sum is stored in the output register unit 390 until another delta-encoded output data Y is received. The output register unit 390 outputs output data Z represented by equation (19) below:

$$Z(t)=Z(t-1)+Y(t) \tag{19}$$

Figure 34:
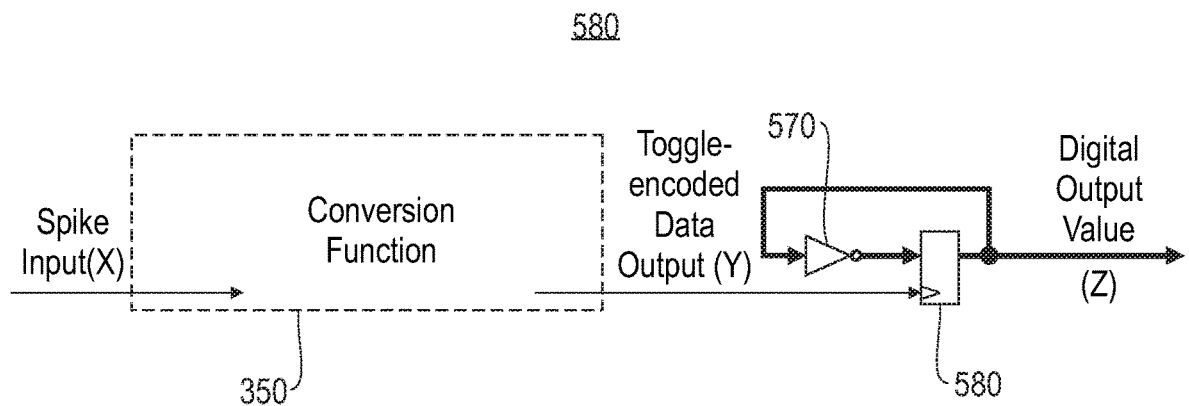
FIG. 34 is an example toggle code system for the spike-to-data converter system, in accordance with an embodiment of the invention.

FIG. 34 is an example toggle code system 580 for the spike-to-data converter system 350, in accordance with an embodiment of the invention. In one embodiment, the spike-to-data converter system 350 outputs toggle-encoded output data Y. The toggle code system 580 comprises an inverter unit 570 and an output register unit 580. For each toggle-encoded output data Y, the inverter unit 570 computes the inverted value. The inverted value is latched to the output register unit 580 with respect to a previous output data Z maintained in the output register unit 580. The output register unit 580 outputs output data Z represented by equation (20) below:

$$Z(t)=NOT\ Z(t-1) \tag{20}$$

Figure 35:
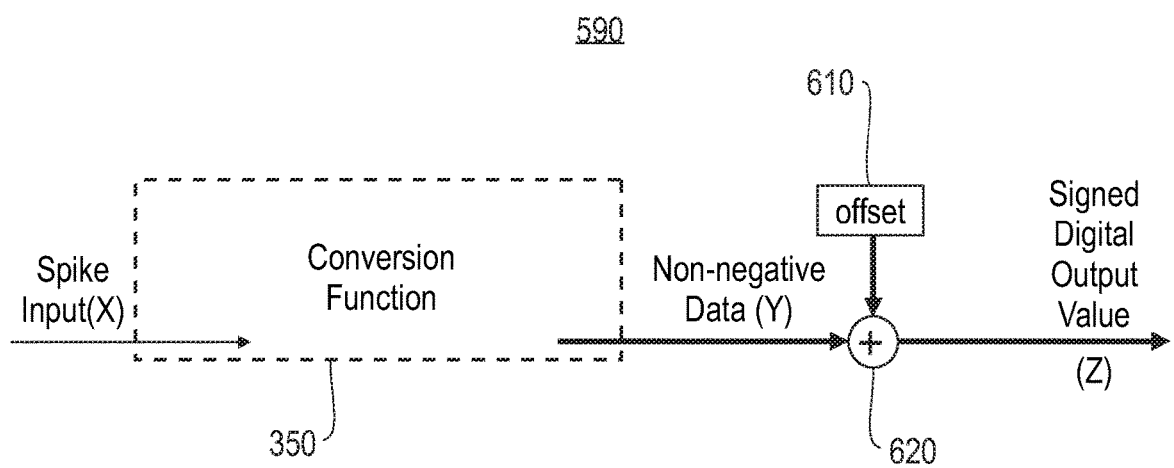
FIG. 35 is an example signed data system for the spike-to-data converter system, in accordance with an embodiment of the invention.

FIG. 35 is an example signed data system 590 for the spike-to-data converter system 350, in accordance with an embodiment of the invention. The signed data system 590 facilitates post-processing of output data Y from the spike-to-data converter system 350. The signed data system 590 comprises an adder unit 620 and a memory unit 610. When the spike-to-data converter system 350 outputs non-negative output data Y, the adder unit 620 adds a configurable offset maintained in the memory unit 610 to the output data Y to generate signed output data Z. The offset is negative to scale data with a non-negative range to signed data.

Figure 36A:
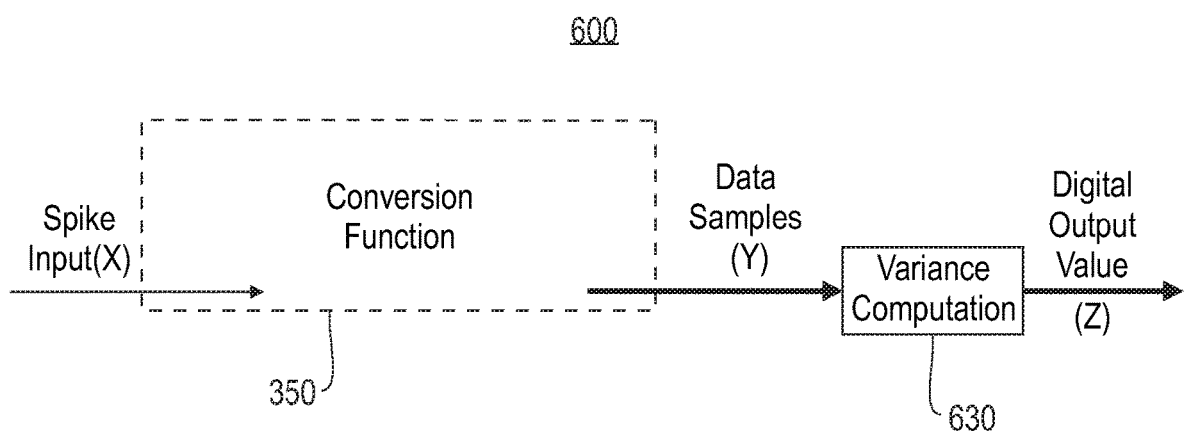
FIG. 36A is an example variance decoding system for the spike-to-data converter system, in accordance with an embodiment of the invention.

FIG. 36A is an example variance decoding system 600 for the spike-to-data converter system 350, in accordance with an embodiment of the invention. The variance decoding system 600 facilitates variance decoding of output data Y from the spike-to-data converter system 350. The variance decoding system 600 comprises a variance computation unit 630. When the spike-to-data converter system 350 outputs non-negative output data Y, the variance computation unit 630 computes a variance that is output as output data Z. The output data Z is represented by equation (21) below:

$$Z=\text{Var}(Y)=E[(Y-\mu)^2] \quad (21).$$

Figure 36B:
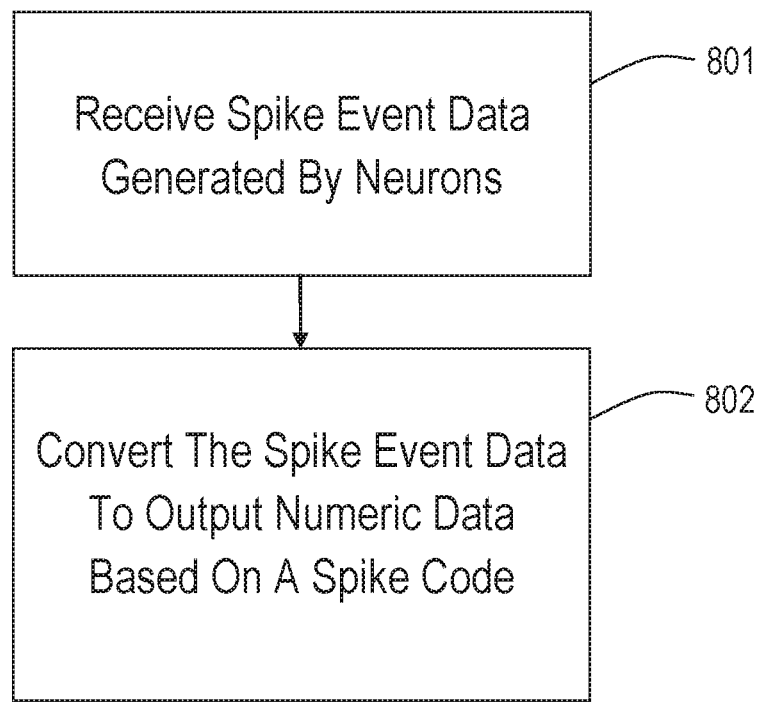
FIG. 36B illustrates a flowchart of an example process utilizing a spike-to-data converter system, in accordance with an embodiment of the invention.

FIG. 36B illustrates a flowchart of an example process 800 utilizing a spike-to-data converter system, in accordance with an embodiment of the invention. In process block 801, receive spike event data generated by neurons. In process block 802, convert the spike event data to output numeric data based on a spike code.

Figure 37:
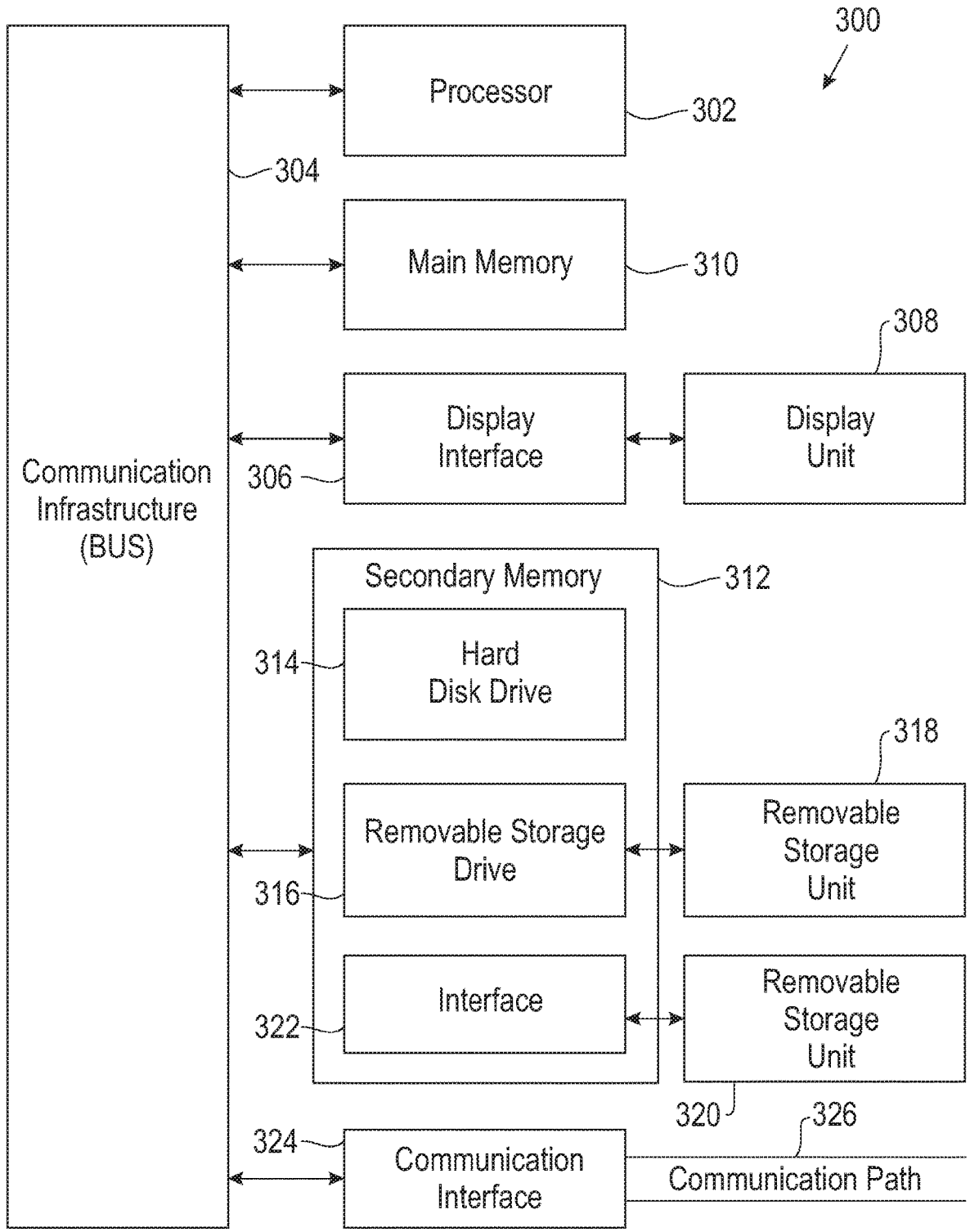
FIG. 37 is a high level block diagram showing an information processing system useful for implementing one embodiment of the invention.

FIG. 37 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for converting spike event data to digital numeric data. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a bus configured to receive a plurality of spike event packets generated by a plurality of neurosynaptic core circuits; and
   a spike-to-data converter unit supporting different spike codes, wherein the spike-to-data converter unit is configured to convert a spike event packet of the plurality of spike event packets into output data encoded in a spike code of the different spike codes by processing the spike event packet in accordance with an equation corresponding to the spike code;

wherein a first output data, encoded in a first spike code of the different spike codes, is converted from a first spike event packet of the plurality of spike event packets by processing the first spike event packet in accordance with a first equation corresponding to the first spike code; and wherein a second output data, encoded in a second spike code of the different spike codes, is converted from a second spike event packet of the plurality of spike event packets by processing the second spike event packet in accordance with a second equation corresponding to the second spike code and different from the first equation.

2. The system of claim 1, wherein each output data comprises digital numeric data representing one or more motor outputs, and each output data is provided to an external environment.

3. The system of claim 1, wherein the spike-to-data converter unit is configured to convert a spike event packet of the plurality of spike event packets into output data encoded in a spike code of the different spike codes utilizing one of a synchronous logic or asynchronous logic.

4. The system of claim 1, wherein:
the first output data includes a first value based on a target address of a target electronic axon of the plurality of neurosynaptic core circuits, the target address included in the first spike event packet; and
the second output data includes a second value based on a timestamp indicative of when the second spike event packet was received at the spike-to-data converter unit.

5. The system of claim 1, wherein:
each neurosynaptic core circuit comprises a plurality of electronic neurons, a plurality of electronic axons, and a plurality of synapse devices for interconnecting the plurality of electronic neurons with the plurality of electronic axons; and
the plurality of neurosynaptic core circuits are interconnected via at least one router for routing spike event packets between the plurality of neurosynaptic core circuits.

6. A system comprising:
a plurality of neurosynaptic core circuits;
a bus configured to receive a plurality of spike event packets generated by the plurality of neurosynaptic core circuits; and
a spike-to-data converter unit supporting different spike codes, wherein the spike-to-data converter unit is configured to convert a spike event packet of the plurality of spike event packets into output data encoded in a spike code of the different spike codes by processing the spike event packet in accordance with an equation corresponding to the spike code;
wherein a first output data, encoded in a first spike code of the different spike codes, is converted from a first spike event packet of the plurality of spike event packets by processing the first spike event packet in accordance with a first equation corresponding to the first spike code; and
wherein a second output data, encoded in a second spike code of the different spike codes, is converted from a second spike event packet of the plurality of spike event packets by processing the second spike event packet in accordance with a second equation corresponding to the second spike code and different from the first equation.

7. The system of claim 6, wherein each output data comprises digital numeric data representing one or more motor outputs, and each output data is provided to an external environment.

8. The system of claim 6, wherein the spike-to-data converter unit is configured to convert a spike event packet of the plurality of spike event packets into output data encoded in a spike code of the different spike codes utilizing one of a synchronous logic or asynchronous logic.

9. The system of claim 6, wherein:
the first output data includes a first value based on a target address of a target electronic axon of the plurality of neurosynaptic core circuits, the target address included in the first spike event packet; and
the second output data includes a second value based on a timestamp indicative of when the second spike event packet was received at the spike-to-data converter unit.

10. The system of claim 6, wherein:
each neurosynaptic core circuit comprises a plurality of electronic neurons, a plurality of electronic axons, and a plurality of synapse devices for interconnecting the plurality of electronic neurons with the plurality of electronic axons; and
the plurality of neurosynaptic core circuits are interconnected via at least one router for routing spike event packets between the plurality of neurosynaptic core circuits.

11. A method comprising:
at a spike-to-data converter unit supporting different spike codes:
receiving, via a bus, a plurality of spike event packets generated by a plurality of neurosynaptic core circuits; and
converting a spike event packet of the plurality of spike event packets into output data encoded in a spike code of the different spike codes by processing the spike event packet in accordance with an equation corresponding to the spike code;
wherein a first output data, encoded in a first spike code of the different spike codes, is different from converted from a first spike event packet of the plurality of spike event packets by processing the first spike event packet in accordance with a first equation corresponding to the first spike code; and
wherein a second output data, encoded in a second spike code of the different spike codes, is converted from a second spike event packet of the plurality of spike event packets by processing the second spike event packet in accordance with a second equation corresponding to the second spike code and different from the first equation.

12. The method of claim 11, wherein each output data comprises digital numeric data representing one or more motor outputs, and each output data is provided to an external environment.

13. The method of claim 11, wherein the spike-to-data converter unit is configured to convert a spike event packet of the plurality of spike event packets into output data encoded in a spike code of the different spike codes utilizing one of a synchronous logic or asynchronous logic.

14. The method of claim 11, wherein:
the first output data includes a first value based on a target address of a target electronic axon of the plurality of neurosynaptic core circuits, the target address included in the first spike event packet; and the second output data includes a second value based on a timestamp indicative of when the second spike event packet was received at the spike-to-data converter unit.

15. The method of claim 11, wherein:

each neurosynaptic core circuit comprises a plurality of electronic neurons, a plurality of electronic axons, and a plurality of synapse devices for interconnecting the plurality of electronic neurons with the plurality of electronic axons; and the plurality of neurosynaptic core circuits are interconnected via at least one router for routing spike event packets between the plurality of neurosynaptic core circuits.

* * * * *